(12) United States Patent
Park et al.

(10) Patent No.: US 10,142,004 B2
(45) Date of Patent: Nov. 27, 2018

(54) METHOD FOR PERFORMING PRE-CODING USING CODEBOOK IN WIRELESS COMMUNICATION SYSTEM AND APPARATUS THEREFOR

(71) Applicants: LG ELECTRONICS INC., Seoul (KR); SOGANG UNIVERSITY RESEARCH FOUNDATION, Seoul (KR)

(72) Inventors: Jonghyun Park, Seoul (KR); Hosik Kang, Seoul (KR); Junyeub Suh, Seoul (KR); Wonjin Sung, Seoul (KR); Kijun Kim, Seoul (KR)

(73) Assignees: LG Electronics Inc., Seoul (KR); Sogang University Research Foundation, Seoul (KR)

( * ) Notice: Subject to any disclaimer, the term of this patent is extended or adjusted under 35 U.S.C. 154(b) by 0 days.

(21) Appl. No.: 15/540,877

(22) PCT Filed: Dec. 18, 2015

(86) PCT No.: PCT/KR2015/013950
§ 371 (c)(1),
(2) Date: Jun. 29, 2017

(87) PCT Pub. No.: WO2016/108482
PCT Pub. Date: Jul. 7, 2016

(65) Prior Publication Data
US 2017/0373745 A1    Dec. 28, 2017

Related U.S. Application Data

(60) Provisional application No. 62/098,310, filed on Dec. 30, 2014.

(51) Int. Cl.
*H04B 7/06* (2006.01)
*H04B 7/0456* (2017.01)
(Continued)

(52) U.S. Cl.
CPC ......... *H04B 7/0639* (2013.01); *H04B 7/0456* (2013.01); *H04B 7/0469* (2013.01);
(Continued)

(58) Field of Classification Search
CPC .......................... H04B 7/0639; H04B 7/0456
See application file for complete search history.

(56) References Cited

U.S. PATENT DOCUMENTS

| | | | |
|---|---|---|---|
| 8,125,884 B1 * | 2/2012 | Li | H04B 7/046 370/203 |
| 2011/0194638 A1 * | 8/2011 | Erell | H04B 7/0417 375/267 |

(Continued)

FOREIGN PATENT DOCUMENTS

WO    2014-073846 A1    5/2014

*Primary Examiner* — Kenneth Lam
(74) *Attorney, Agent, or Firm* — Dentons US LLP

(57) ABSTRACT

A method for performing, by a UE, precoding using a codebook in a wireless communication system includes: receiving a reference signal for channel estimation from an eNB; estimating a channel through the received reference signal; determining a precoding matrix related to the estimated channel in a codebook; and feeding back, to the eNB, a precoding matrix index (PMI) corresponding to the determined precoding matrix, wherein the codebook is generated in consideration of at least one of a region to which the UE belongs and the position of the UE.

12 Claims, 26 Drawing Sheets

(51) Int. Cl.
    *H04L 25/02*     (2006.01)
    *H04L 25/03*     (2006.01)
    *H04B 7/024*     (2017.01)

(52) U.S. Cl.
    CPC ....... *H04B 7/0478* (2013.01); *H04L 25/0224* (2013.01); *H04L 25/03343* (2013.01); *H04B 7/024* (2013.01)

(56) References Cited

U.S. PATENT DOCUMENTS

| | | | |
|---|---|---|---|
| 2011/0216846 | A1 | 9/2011 | Lee et al. |
| 2012/0195264 | A1* | 8/2012 | Taoka ............... H04B 7/0434 370/328 |
| 2012/0208541 | A1* | 8/2012 | Luo .................. H04W 72/082 455/437 |
| 2012/0281783 | A1* | 11/2012 | Cheng ............... H04B 7/0456 375/295 |
| 2013/0034000 | A1* | 2/2013 | Huo ................ H04L 25/03343 370/252 |
| 2013/0194931 | A1* | 8/2013 | Lee .................... H04L 5/0053 370/241 |
| 2013/0286866 | A1* | 10/2013 | Hammarwall ......... H04B 7/024 370/252 |
| 2013/0343216 | A1 | 12/2013 | Su et al. |
| 2014/0177744 | A1 | 6/2014 | Krishnamurthy et al. |
| 2014/0211873 | A1 | 7/2014 | Park et al. |
| 2015/0229456 | A1* | 8/2015 | Wild .................. H04B 7/024 375/295 |
| 2015/0372729 | A1* | 12/2015 | Tajima ............... H04B 7/0456 375/267 |
| 2017/0244451 | A1* | 8/2017 | Raghavan ........... H04B 7/0408 |

\* cited by examiner

【Figure 1】
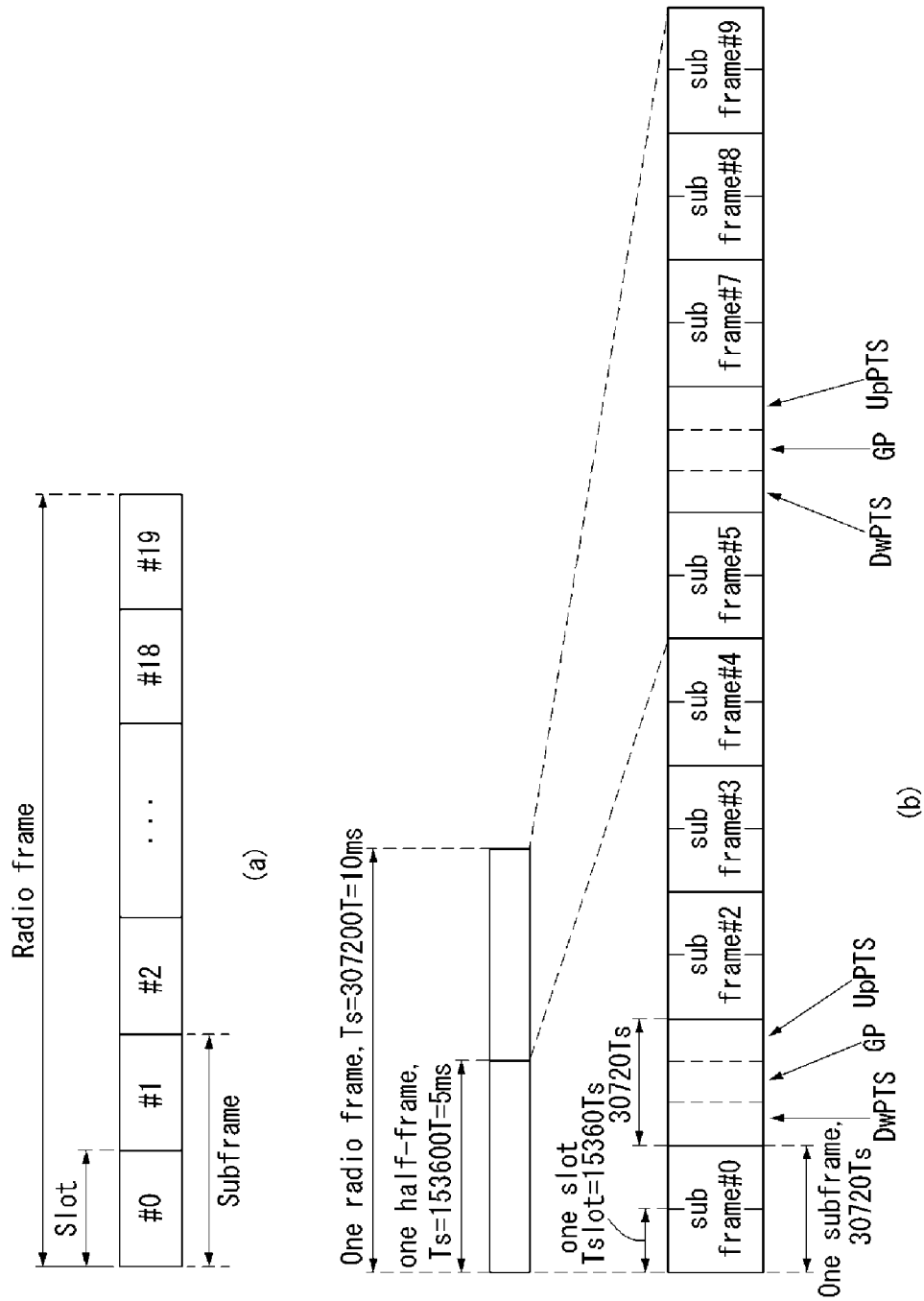

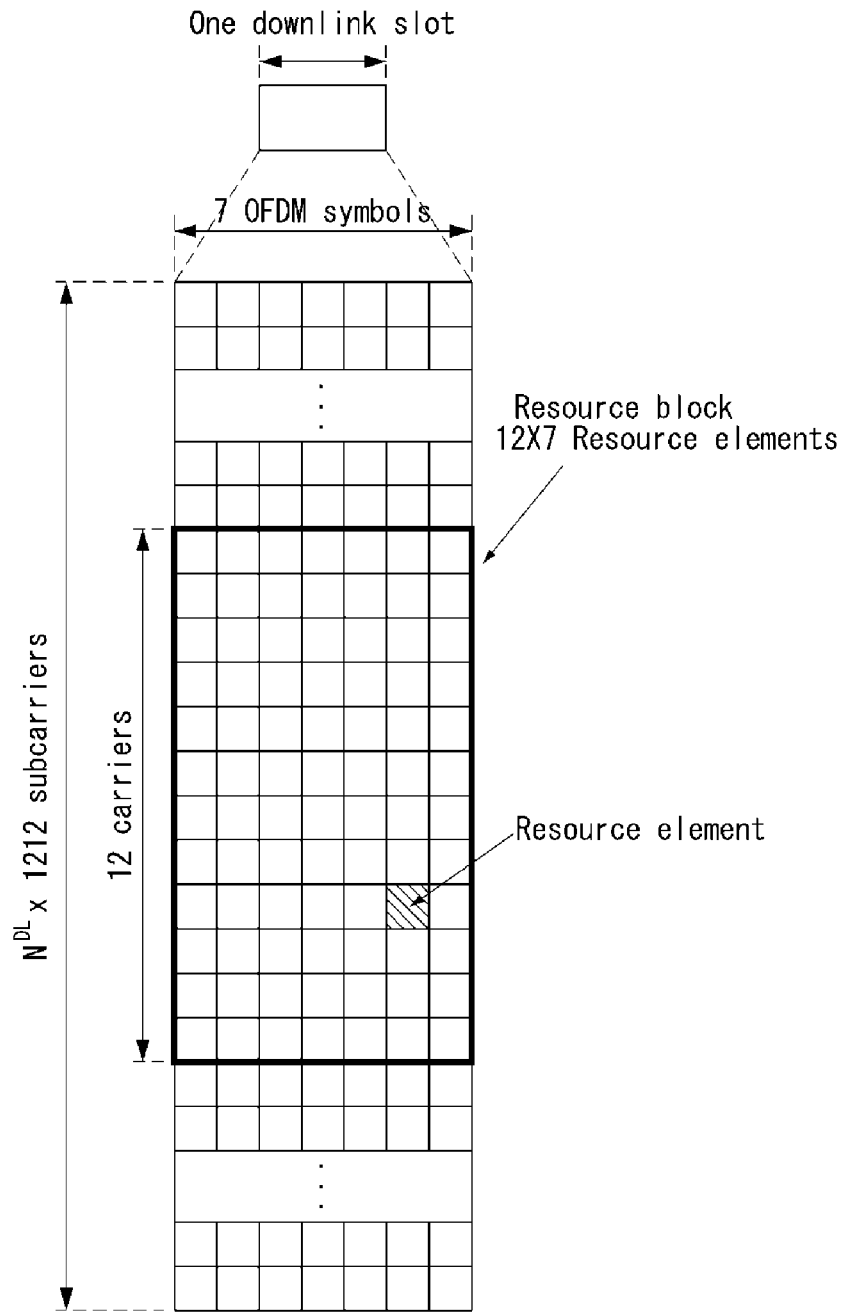
[Figure 2]

[Figure 3]
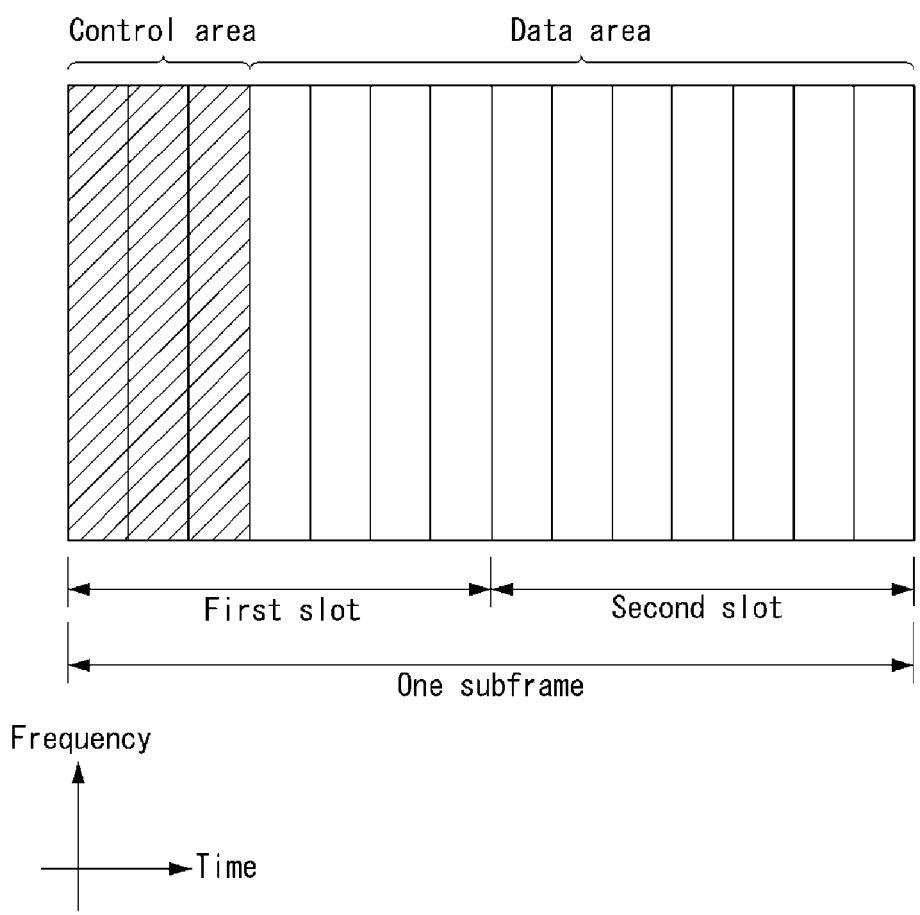

[Figure 4]
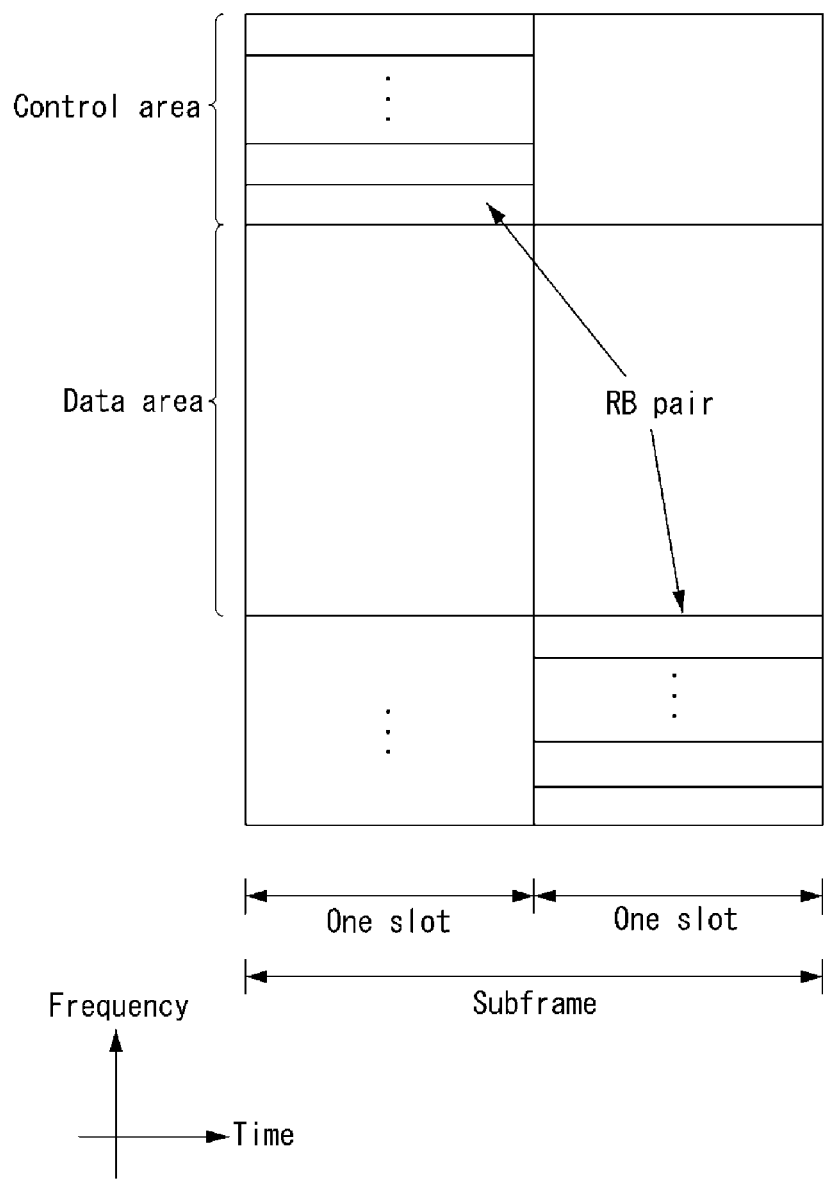

【Figure 5】
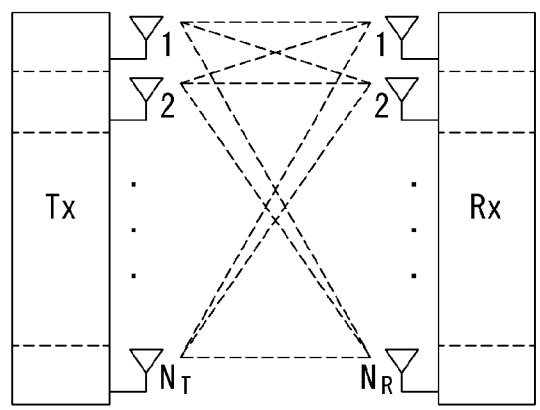
【Figure 6】
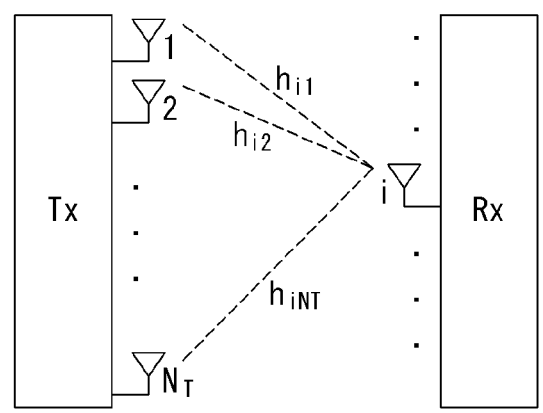

【Figure 7】
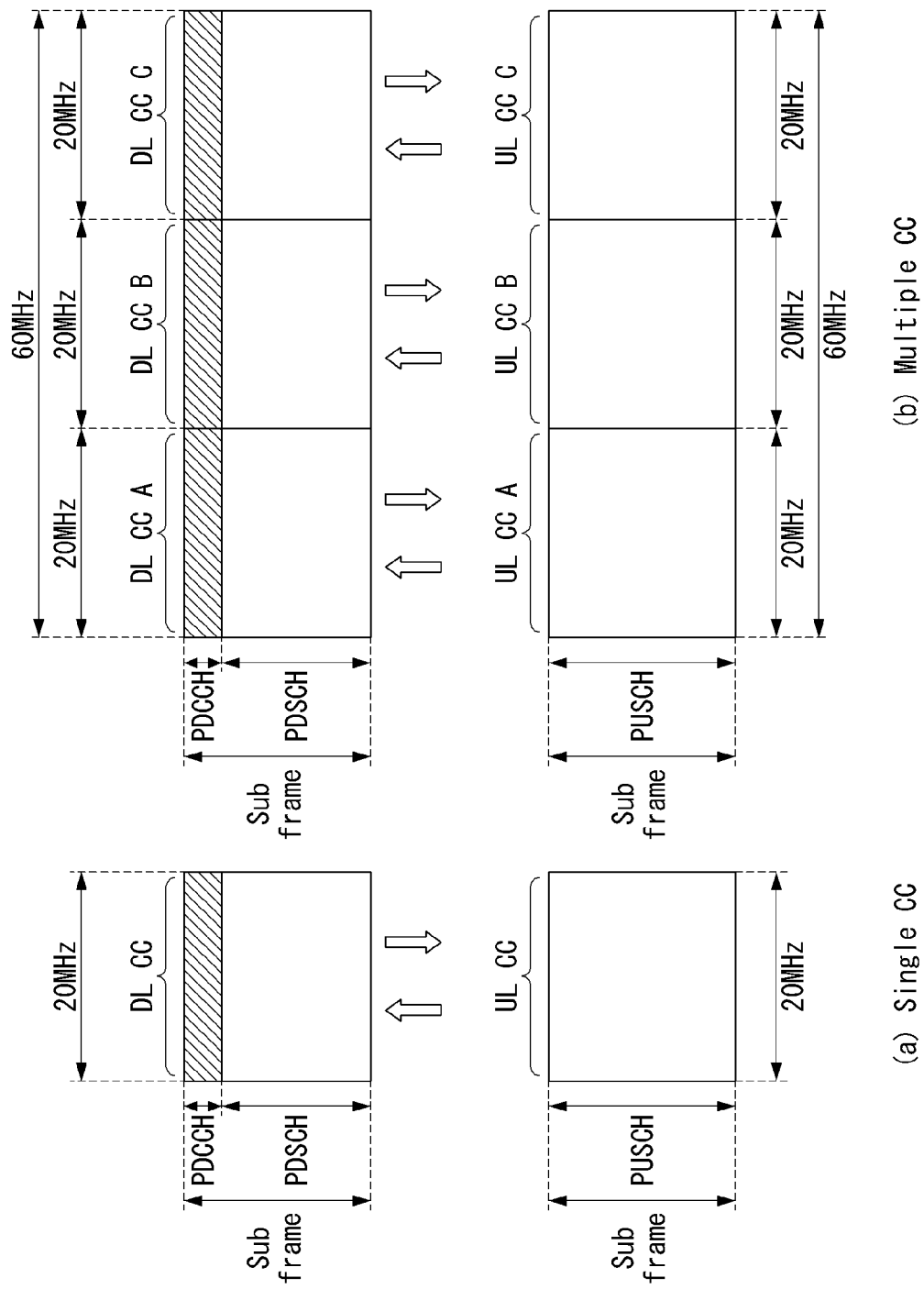

【Figure 8】
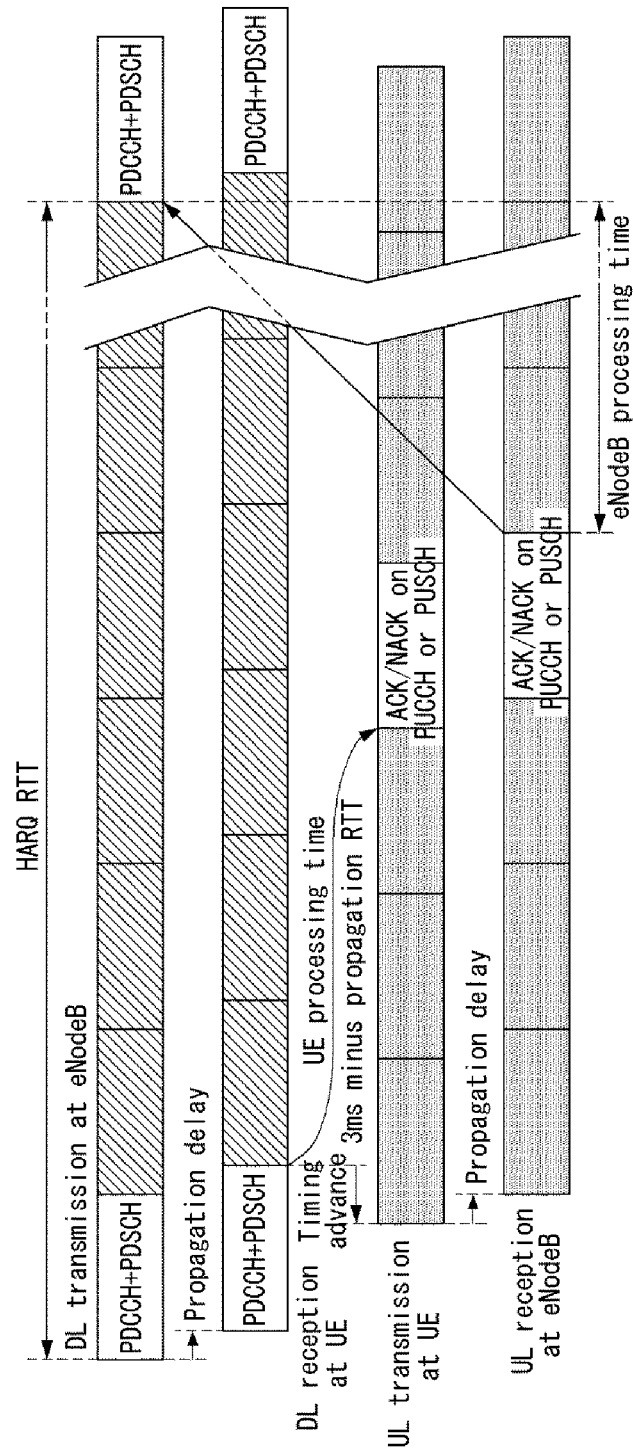

[Figure 9]
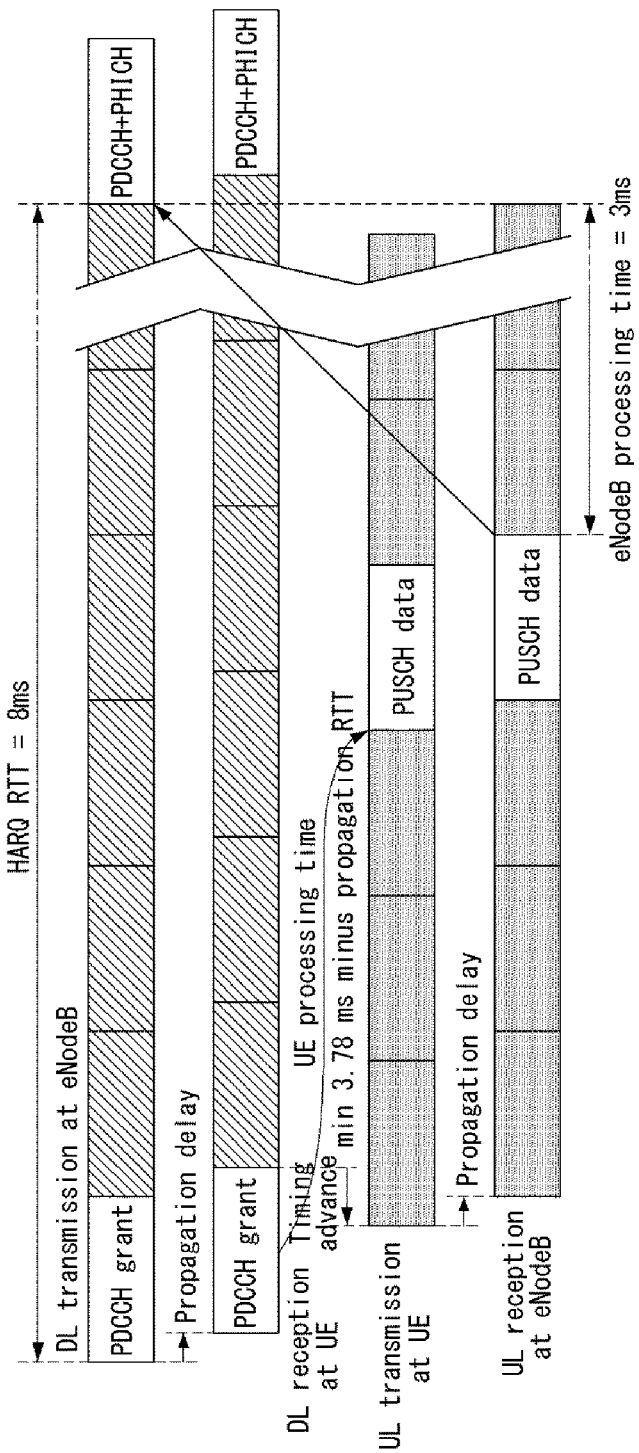

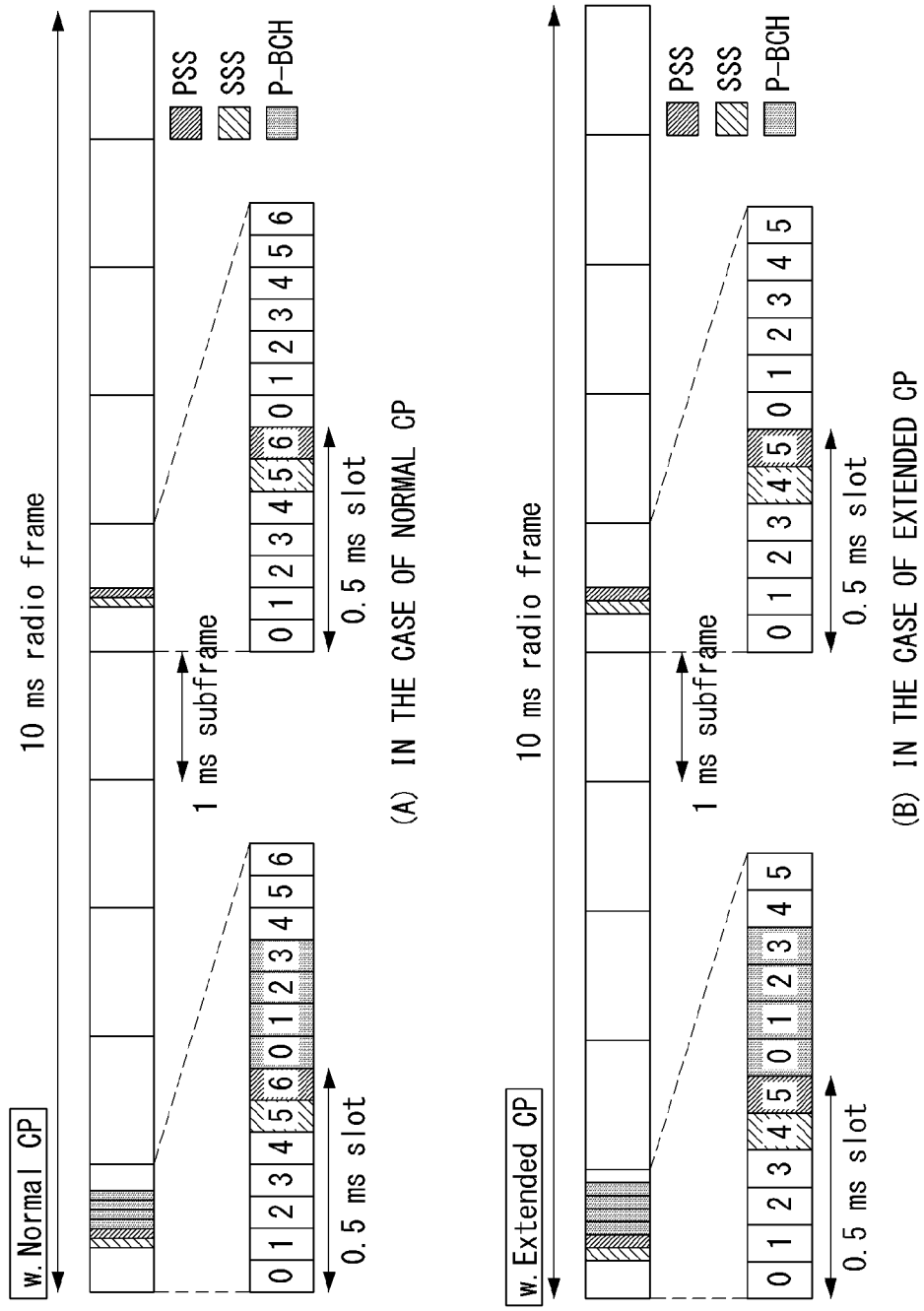
【Figure 10】

【Figure 11】
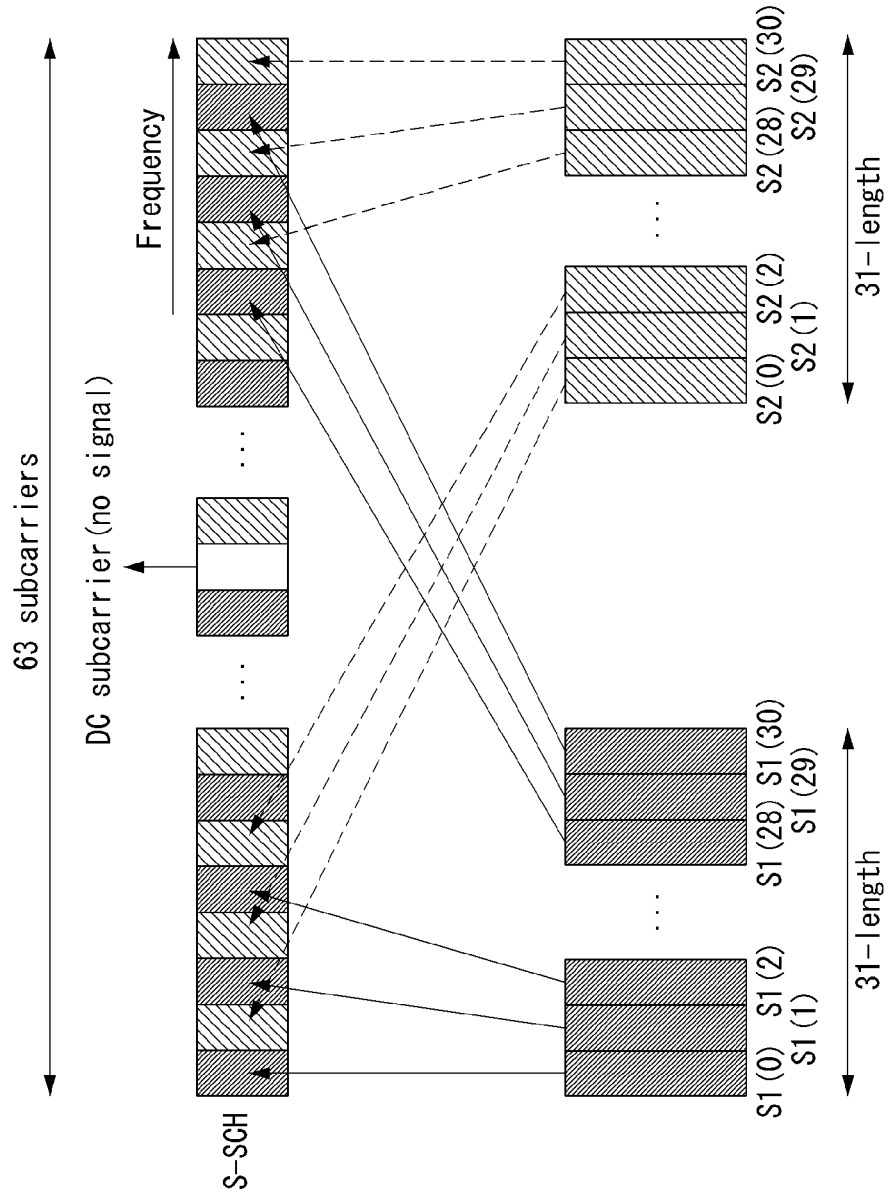

[Figure 12]
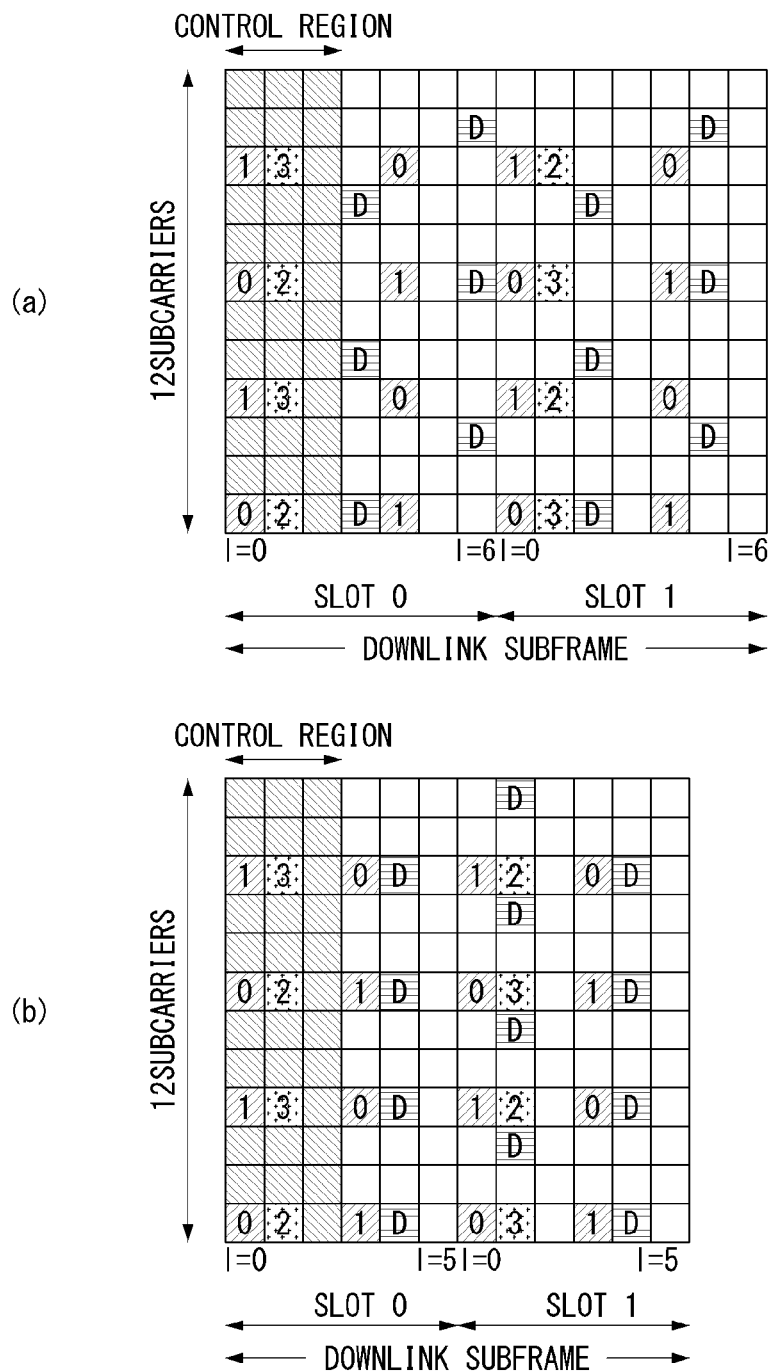

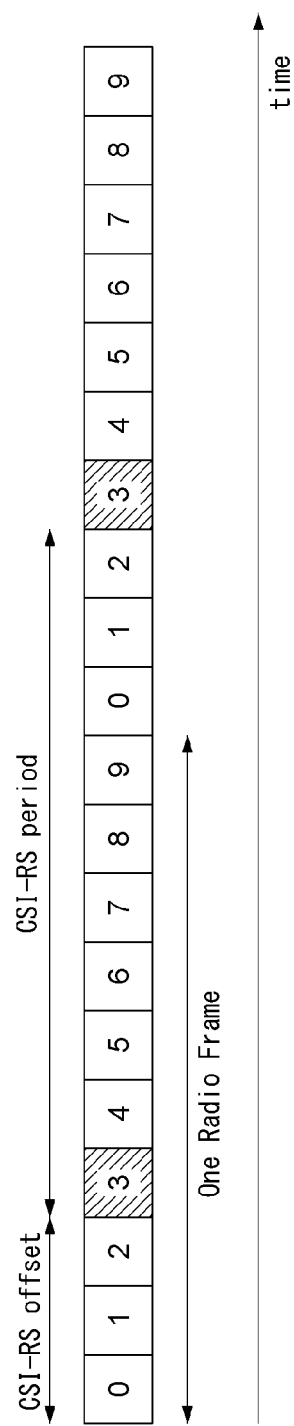
[Figure 13]

[Figure 14]
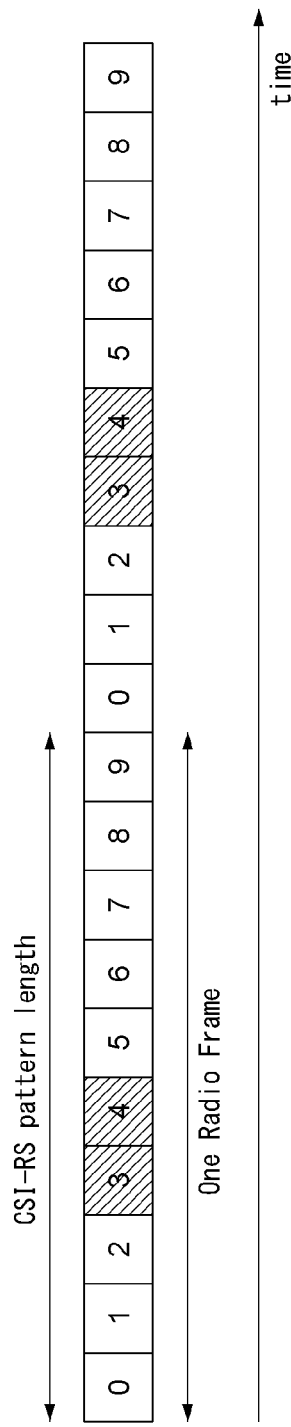

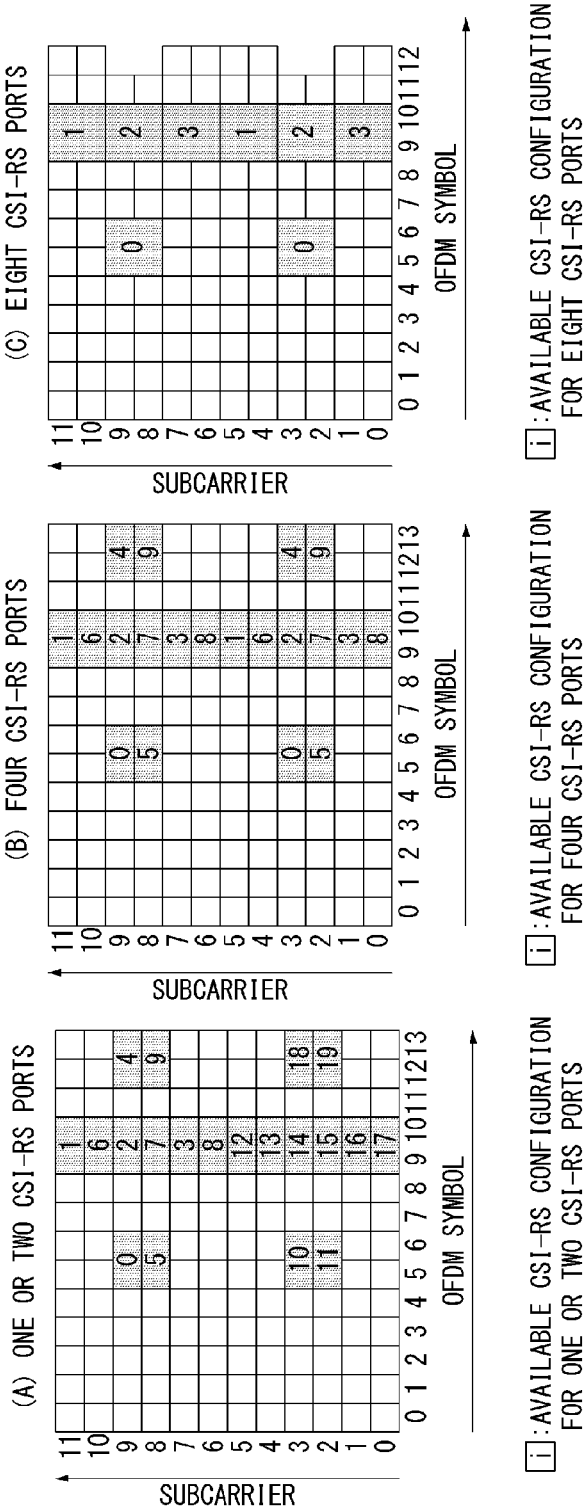
[Figure 15]

【Figure 16】
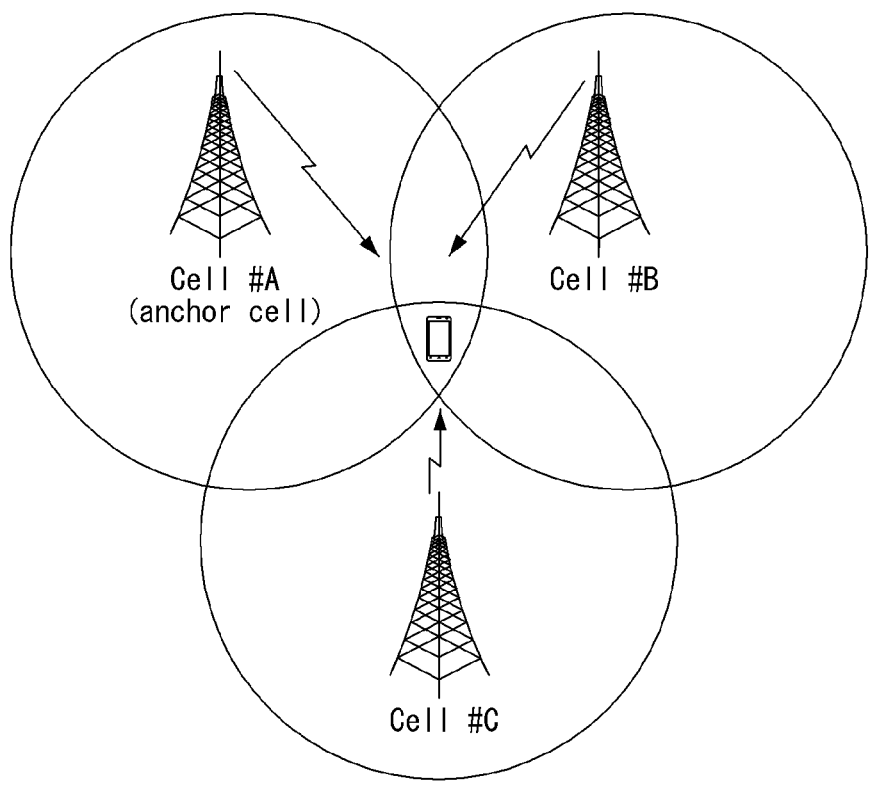
【Figure 17】
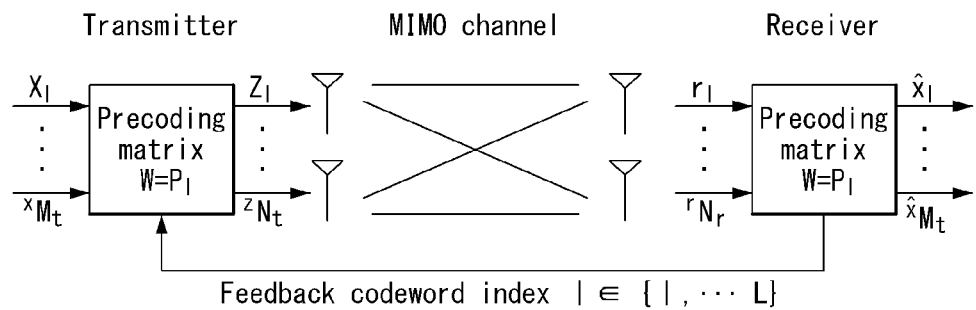

[Figure 18]
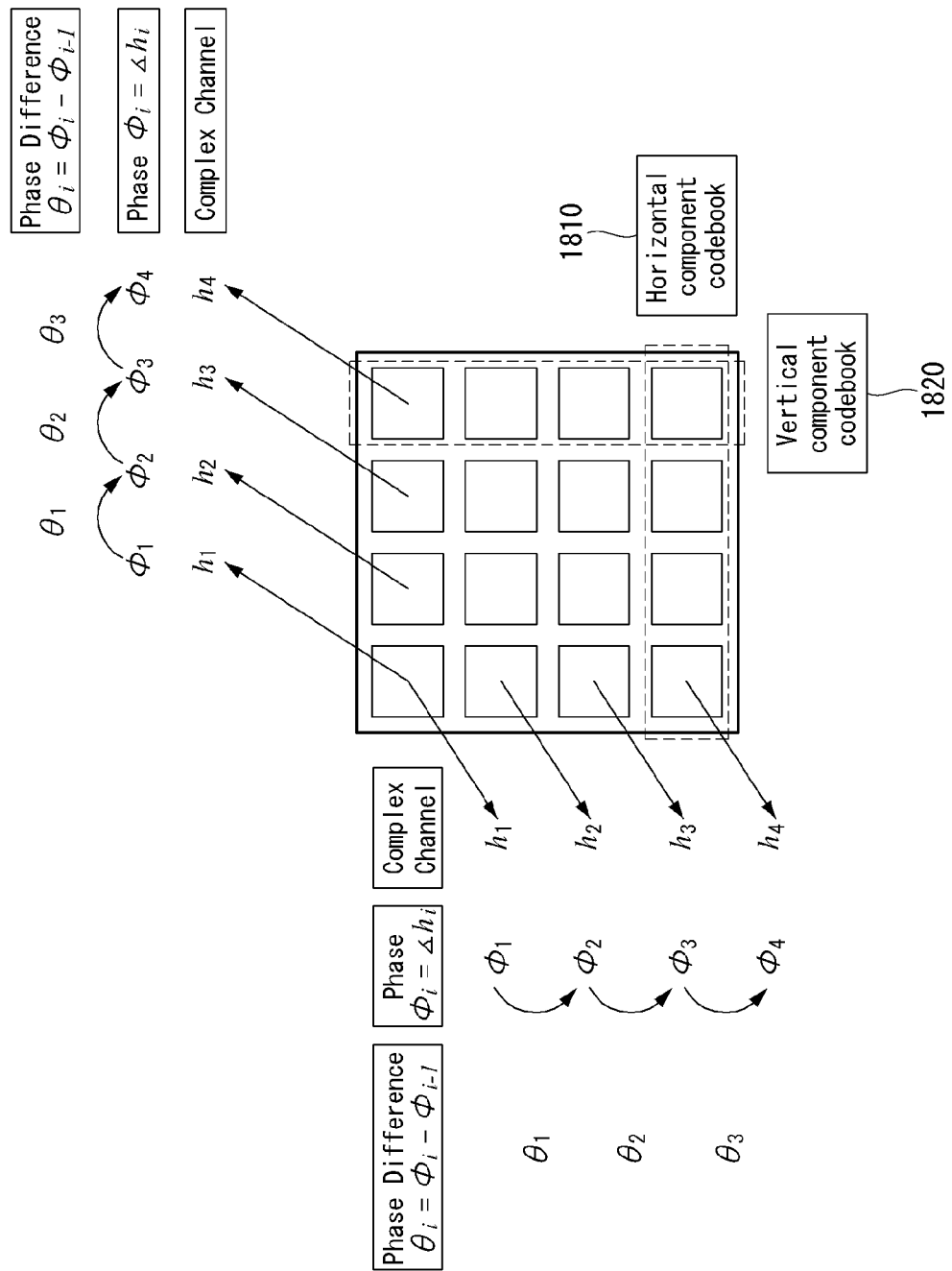

【Figure 19】
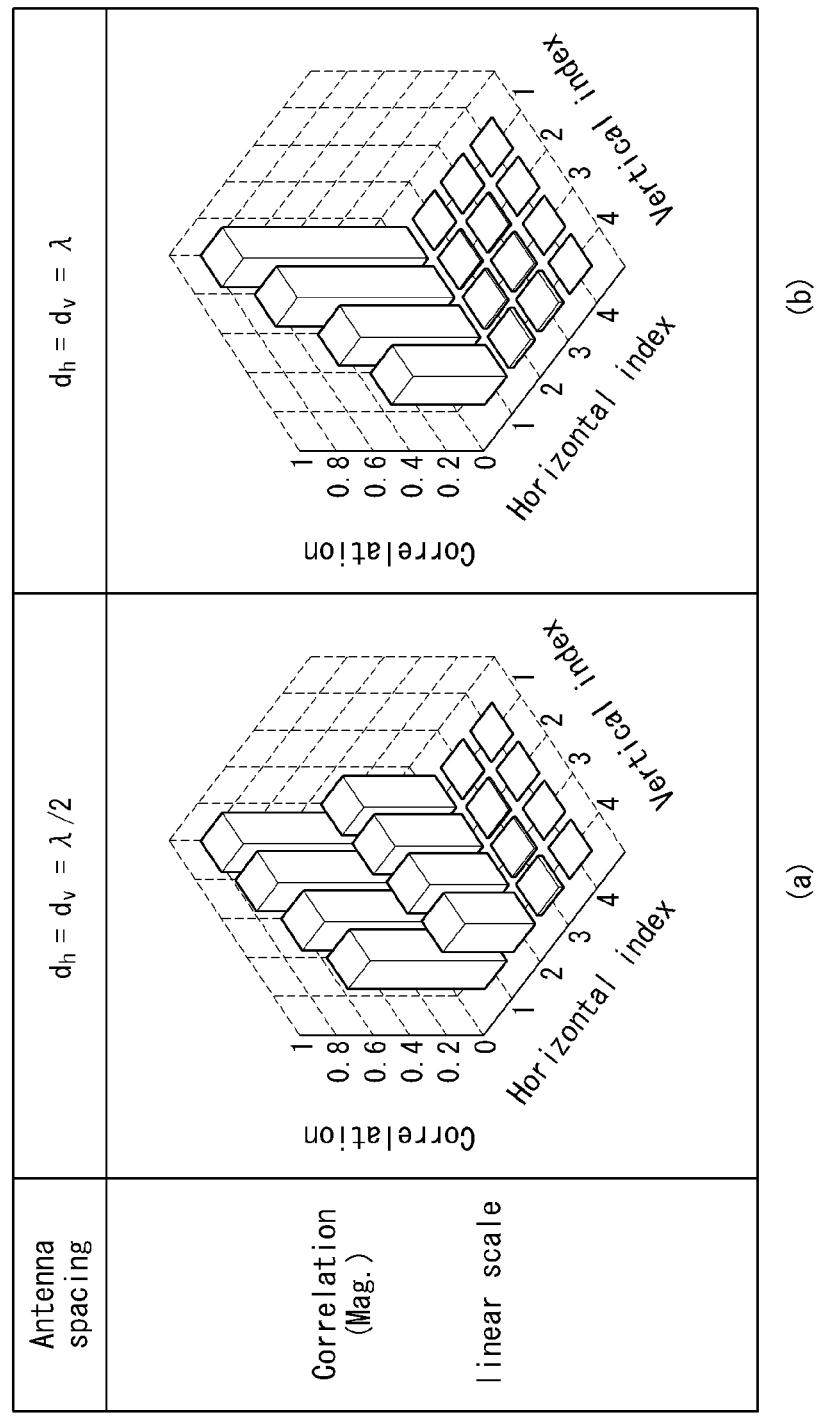

[Figure 20]
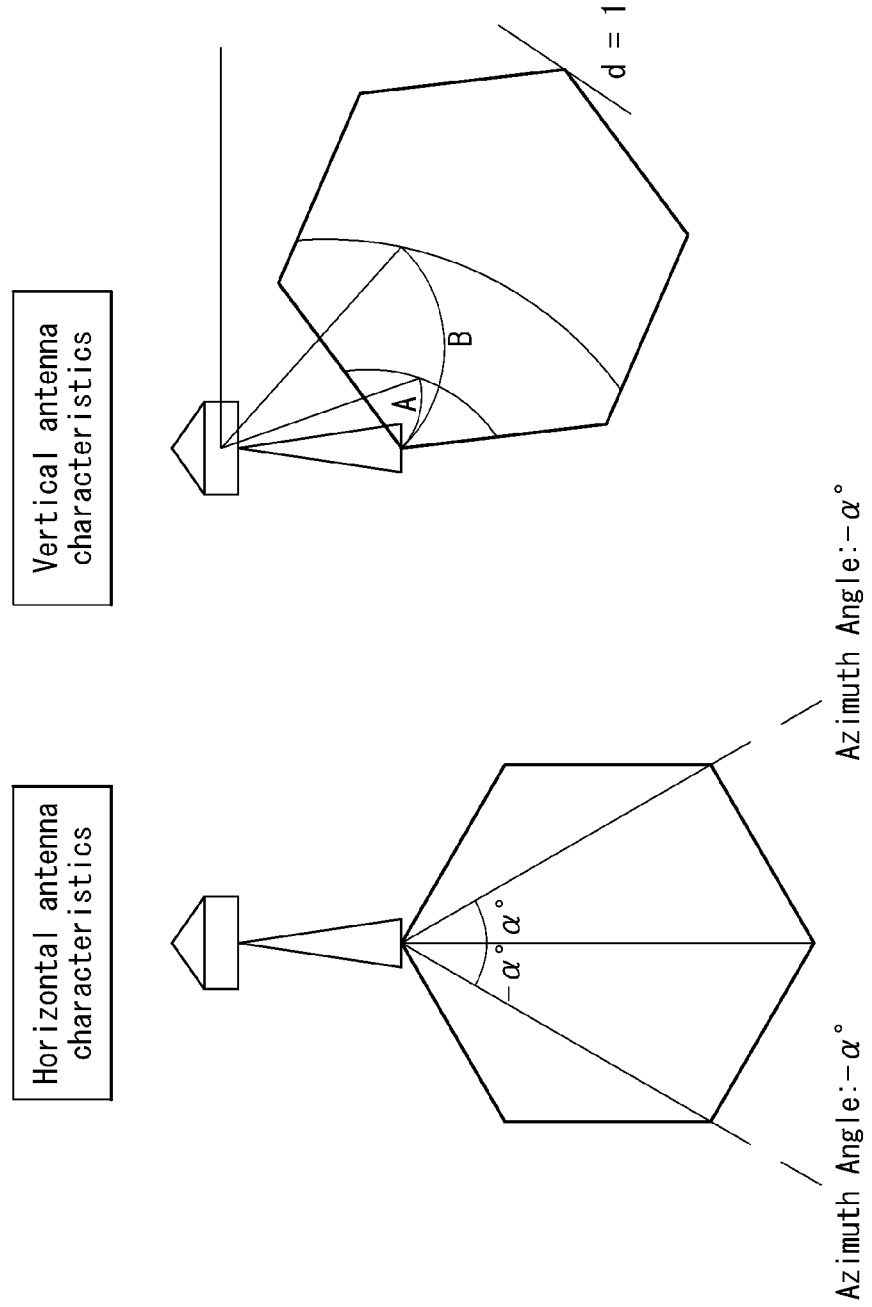

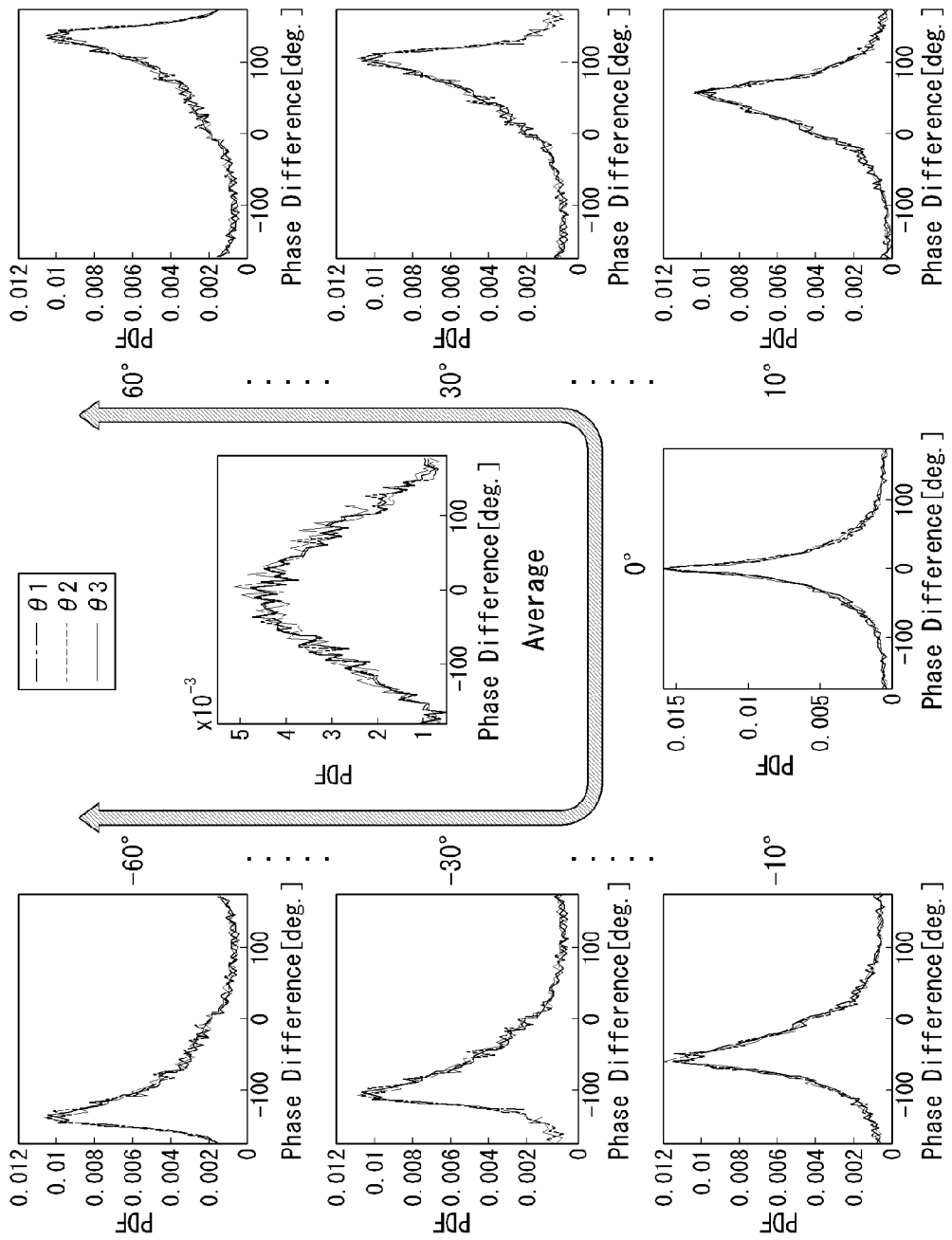
[Figure 21]

【Figure 22】
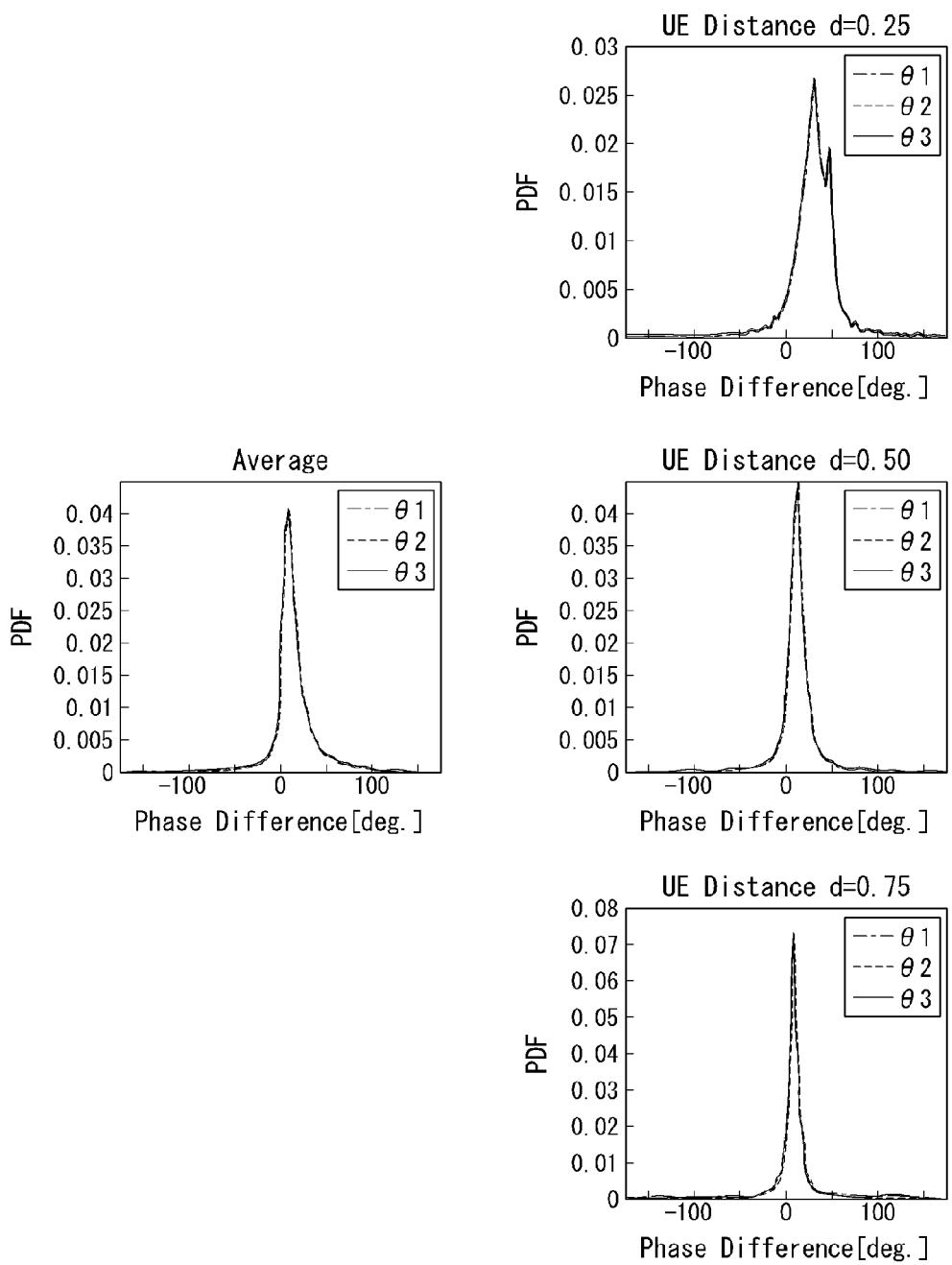

【Figure 23】
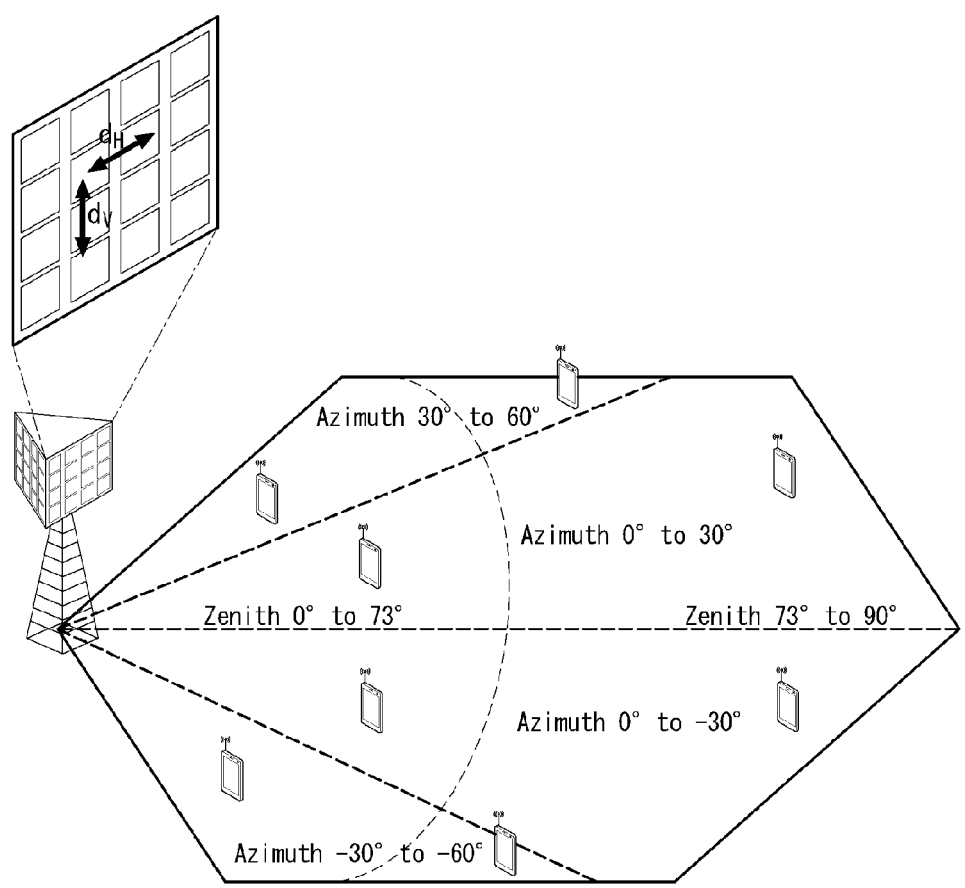

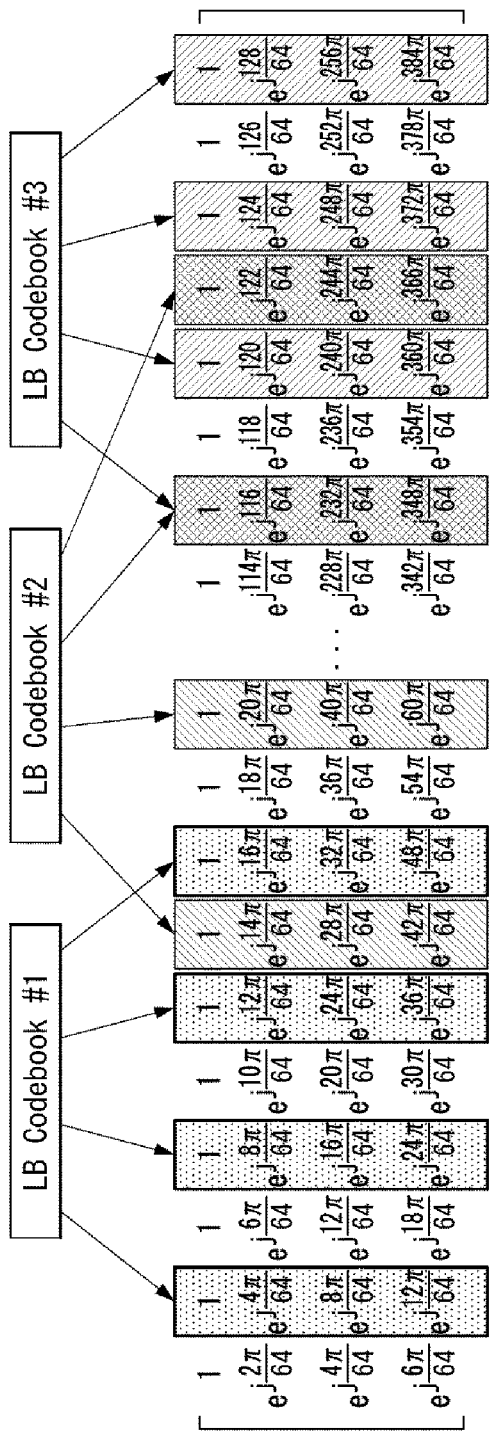
[Figure 24]

[Figure 25]
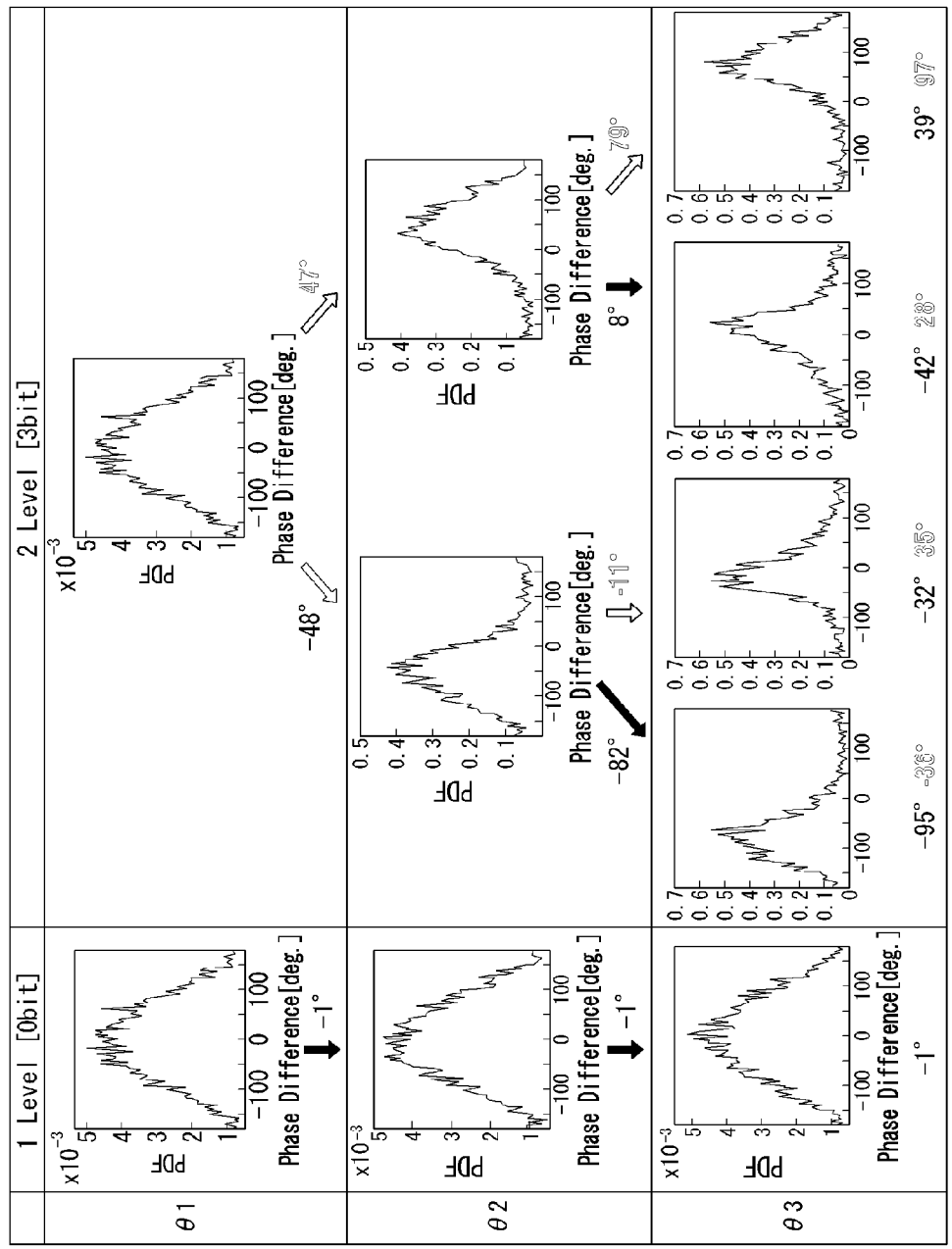

【Figure 26】
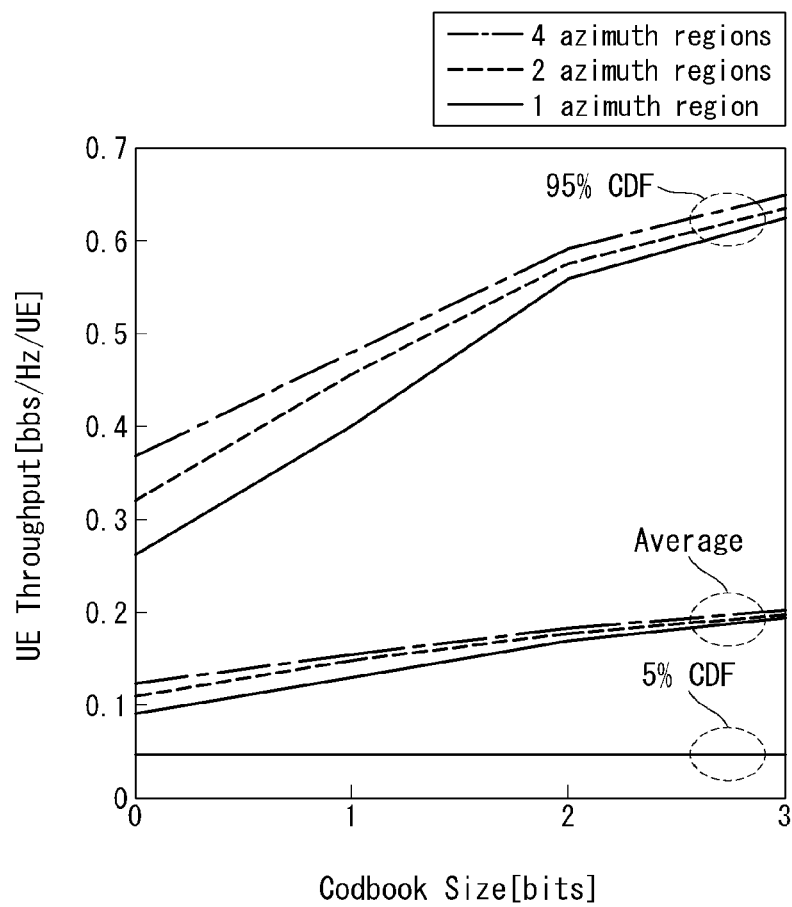

【Figure 27】
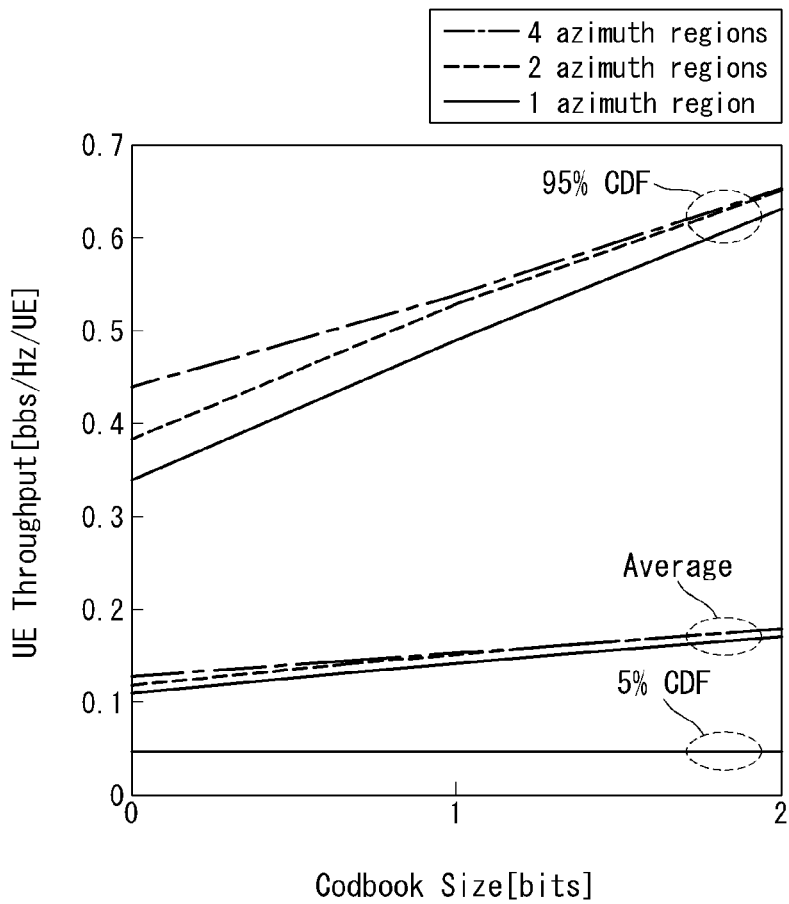
【Figure 28】
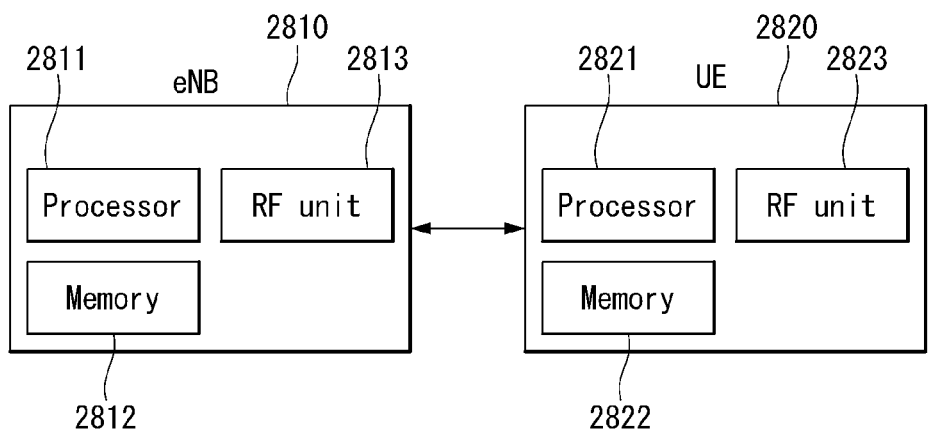

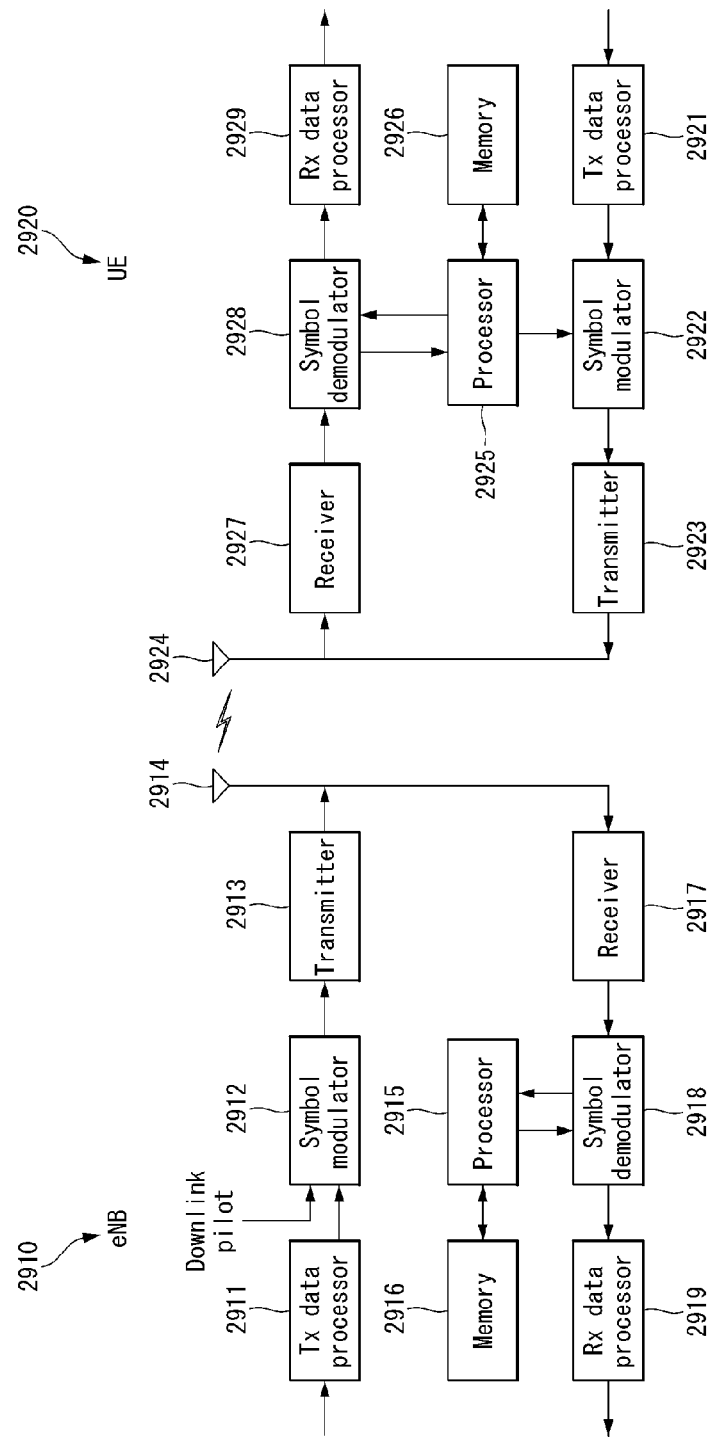
[Figure 29]

METHOD FOR PERFORMING PRE-CODING USING CODEBOOK IN WIRELESS COMMUNICATION SYSTEM AND APPARATUS THEREFOR

This application is a 35 USC § 371 National Stage entry of International Application No. PCT/KR2015/013950, filed on Dec. 18, 2015, and claims priority to U.S. Provisional Application No. 62/098,310, filed Dec. 30, 2014 all of which are incorporated by reference in their entirety herein.

CROSS-REFERENCE TO RELATED APPLICATIONS

This application is the National Stage filing under 35 U.S.C. 371 of International Application No. PCT/KR2015/013950, filed on Dec. 18, 2015, which claims the benefit of U.S. Provisional Application No. 62/098,310, filed on Dec. 30, 2014, the contents of which are all hereby incorporated by reference herein in their entirety.

TECHNICAL FIELD

The present invention relates to a wireless communication system, and more specifically, to a method for performing precoding using a codebook in a wireless communication system and an apparatus supporting the same.

BACKGROUND ART

Mobile communication systems have been developed in order to provide audio services while securing user mobility. While mobile communication systems extend services to data services in addition to audio services, current explosive traffic increase causes resource shortage and users require faster services. Accordingly, enhanced mobile communication systems are needed.

Future mobile communication systems need to accept explosive data traffic and a considerably increased number of connected devices, remarkably increased throughput per user, have very low end-to-end latency and support high energy efficiency. To this end, various technologies such as dual connectivity, massive MIMO (Massive Multiple Input Multiple Output), in-band full duplex, NOMA (Non-Orthogonal Multiple Access), super wideband and device networking are researched.

DISCLOSURE

Technical Problem

An object of the present description is to provide a method for recognizing channel characteristics through 3D SCM channel analysis and then using a codebook suitable for an actual channel environment such as a 3D SCM channel.

In addition, an object of the present description is to provide a method for using or generating different codebooks for regions divided from a sector of an eNB.

Furthermore, an object of the present description is to provide a method for estimating the position of a UE through various methods and notifying an eNB of use of a related codebook.

Moreover, an object of the present description is to provide a method for selecting a quantization level on the basis of a phase difference between neighbor antennas and generating a precoding matrix vector.

The technical problems solved by the present invention are not limited to the above technical problems and other technical problems which are not described herein will become apparent to those skilled in the art from the following description.

Technical Solution

A method for performing, by a UE, precoding using a codebook in a wireless communication system includes: receiving a reference signal for channel estimation from an eNB; estimating a channel through the received reference signal; determining a precoding matrix related to the estimated channel in a codebook; and feeding back, to the eNB, a precoding matrix index (PMI) corresponding to the determined precoding matrix, wherein the codebook is generated in consideration of at least one of a region to which the UE belongs and the position of the UE.

The region to which the UE belongs may correspond to one of M×N regions generated by dividing a specific sector of the eNB into M regions in a first direction and N regions in a second direction (M and N being natural numbers).

Different codebooks are used in the M×N regions.

When multiple codebooks are selected according to regions to which the UE belongs, the codebook may be selected from the selected multiple codebooks in consideration of the position of the UE.

At least one of a channel phase difference and a channel correlation difference between neighbor antennas of the eNB may be generated according to at least one of the region to which the UE belongs and the position of the UE.

The codebook may be generated through selecting a quantization level for a first phase difference between neighbor antennas of the eNB and selecting a quantization level for a second phase difference on the basis of the selected quantization level for the first phase difference.

The quantization level for the first phase difference may be selected in consideration of at least one of the region to which the UE belongs and the position of the UE.

The quantization level for the second phase difference may be selected on the basis of predefined precoding matrix vector generation function or pattern information.

The method may further include transmitting a parameter related to an angular spread between the eNB and the UE to the eNB.

The codebook may be selected in such a manner that a first codebook set is selected on the basis of the parameter related to the angular spread, a second codebook set may be selected from the selected first codebook set on the basis of the region to which the UE belongs and/or the position of the UE, and one of the selected second codebook set may be selected.

The angular spread may be divided into an azimuth angular spread and a zenith angular spread.

The position of the UE may be acquired through at least one of a PRS (Positioning Reference Signal) based OTDOA (Observed Time Difference Of Arrival) positioning method, a SRS (Sounding Reference Signal) based UTDOA (Uplink Time Difference Of Arrival) method, an A-GNSS (Assisted-Global Navigation Satellite Systems) method using a satellite/GPS and an RFPM (Radio Frequency Pattern Matching) method.

A UE for performing precoding using a codebook in a wireless communication system includes: a radio frequency (RF) unit for transmitting and receiving radio signals; and a processor functionally connected to the RF unit and controlling the UE, wherein the processor is configured: to receive a reference signal for channel estimation from an eNB; to estimate a channel through the received reference signal; to determine a precoding matrix related to the estimated channel in a codebook; and to feed back, to the eNB, a precoding matrix index (PMI) corresponding to the determined precoding matrix, wherein the codebook is generated in consideration of at least one of a region to which the UE belongs and the position of the UE.

Advantageous Effects

The present description can select a codebook suitable for each region by analyzing 3D SCM channel characteristics depending on regions and improve performance in terms of throughput using the selected codebook.

That is, the region based codebook generation method proposed in the present description can improve performance in terms of throughput by adding region information to codebooks currently used in a multi-antenna system.

The effects of the present invention are not limited to the above-described effects and other effects which are not described herein may be derived by those skilled in the art from the following description of the embodiments of the present invention.

DESCRIPTION OF DRAWINGS

The accompanying drawings, which are included to provide a further understanding of the invention, illustrate embodiments of the invention and together with the description serve to explain the principle of the invention.

FIG. 1 illustrates a radio frame structure in a wireless communication system to which the present invention is applicable.

FIG. 2 illustrates a resource grid for a single downlink slot in a wireless communication system to which the present invention is applicable.

FIG. 3 illustrates a downlink subframe structure in a wireless communication system to which the present invention is applicable.

FIG. 4 illustrates an uplink subframe structure in a wireless communication system to which the present invention is applicable.

FIG. 5 illustrates a configuration of a general multiple-input multiple-output (MIMO) antenna communication system.

FIG. 6 illustrates channels from multiple transmit (Tx) antennas to a single reception (Rx) antenna.

FIG. 7 illustrates an example of component carriers and carrier aggregation in a wireless communication system to which the present invention is applicable.

FIG. 8 illustrates a downlink HARQ process in an LTE FDD system to which the present invention is applicable.

FIG. 9 illustrates an uplink HARQ process in an LTE FDD system to which the present invention is applicable.

FIG. 10 illustrates a radio frame structure for synchronization signal transmission in a wireless communication system to which the present invention is applicable.

FIG. 11 illustrates a secondary synchronization signal structure in a wireless communication system to which the present invention is applicable.

FIG. 12 illustrates reference signal patterns mapped to downlink resource block pairs in a wireless communication system to which the present invention is applicable.

FIG. 13 illustrates a periodic CSI-RS transmission scheme in a wireless communication system to which the present invention is applicable.

FIG. 14 illustrates an aperiodic CSI-RS transmission scheme in a wireless communication system to which the present invention is applicable.

FIG. 15 illustrates CSI-RS configurations in a wireless communication system to which the present invention is applicable.

FIG. 16 illustrates an OTDOA method for positioning a UE.

FIG. 17 illustrates the basic concept of codebook based precoding.

FIG. 18 illustrates an example of a 2D antenna array structure to which methods proposed in the present description are applicable.

FIG. 19 illustrates an example of channel correlation between neighbor antennas in the antenna array of FIG. 18.

FIG. 20 illustrates an example of a UE distribution for analyzing antenna characteristics proposed in the present description.

FIG. 21 illustrates an example of a vertical antenna channel phase difference according to UE location of FIG. 20.

FIG. 22 illustrates an example of a horizontal antenna channel phase difference according to UE location of FIG. 20.

FIG. 23 illustrates an example of the concept of region division for region based codebook generation proposed in the present description.

FIG. 24 illustrates an example of DFT codebook selection using region information proposed in the present description.

FIG. 25 illustrates an example of a codebook generation method using a phase difference between neighbor antennas and a conditional probability distribution proposed in the present description.

FIGS. 26 and 27 illustrate UE throughput results as a codebook performance index based on region information.

FIG. 28 is a block diagram of a wireless communication apparatus according to an embodiment of the present invention.

FIG. 29 is a block diagram of a wireless communication apparatus according to another embodiment of the present invention.

BEST MODE

Hereafter, preferred embodiments of the present invention will be described in detail with reference to the accompanying drawings. A detailed description to be disclosed hereinbelow together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A is primarily described for clear description, but technical features of the present invention are not limited thereto.

General System

FIG. 1 illustrates a structure a radio frame in a wireless communication system to which the present invention can be applied.

In 3GPP LTE/LTE-A, radio frame structure type 1 may be applied to frequency division duplex (FDD) and radio frame structure type 2 may be applied to time division duplex (TDD) are supported.

FIG. 1(a) exemplifies radio frame structure type 1. The radio frame is constituted by 10 subframes. One subframe is constituted by 2 slots in a time domain. A time required to transmit one subframe is referred to as a transmissions time interval (TTI). For example, the length of one subframe may be 1 ms and the length of one slot may be 0.5 ms.

One slot includes a plurality of orthogonal frequency division multiplexing (OFDM) symbols in the time domain and includes multiple resource blocks (RBs) in a frequency domain. In 3GPP LTE, since OFDMA is used in downlink, the OFDM symbol is used to express one symbol period. The OFDM symbol may be one SC-FDMA symbol or symbol period. The resource block is a resource allocation wise and includes a plurality of consecutive subcarriers in one slot.

FIG. 1(b) illustrates frame structure type 2. Radio frame type 2 is constituted by 2 half frames, each half frame is constituted by 5 subframes, a downlink pilot time slot (DwPTS), a guard period (GP), and an uplink pilot time slot (UpPTS), and one subframe among them is constituted by 2 slots. The DwPTS is used for initial cell discovery, synchronization, or channel estimation in a terminal. The UpPTS is used for channel estimation in a base station and to match uplink transmission synchronization of the terminal. The guard period is a period for removing interference which occurs in uplink due to multi-path delay of a downlink signal between the uplink and the downlink.

In frame structure type 2 of a TDD system, an uplink-downlink configuration is a rule indicating whether the uplink and the downlink are allocated (alternatively, reserved) with respect to all subframes. Table 1 shows he uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, for each sub frame of the radio frame, 'D' represents a subframe for downlink transmission, 'U' represents a subframe for uplink transmission, and 'S' represents a special subframe constituted by three fields such as the DwPTS, the GP, and the UpPTS. The uplink-downlink configuration may be divided into 7 configurations and the positions and/or the numbers of the downlink subframe, the special subframe, and the uplink subframe may vary for each configuration.

A time when the downlink is switched to the uplink or a time when the uplink is switched to the downlink is referred to as a switching point. Switch-point periodicity means a period in which an aspect of the uplink subframe and the downlink subframe are switched is similarly repeated and both 5 ms or 10 ms are supported. When the period of the downlink-uplink switching point is 5 ms, the special subframe S is present for each half-frame and when the period of the downlink-uplink switching point is 5 ms, the special subframe S is present only in a first half-frame.

In all configurations, subframes #0 and #5 and the DwPTS are intervals only the downlink transmission. The UpPTS and a subframe just subsequently to the subframe are continuously intervals for the uplink transmission.

The uplink-downlink configuration may be known by both the base station and the terminal as system information. The base station transmits only an index of configuration information whenever the uplink-downlink configuration information is changed to announce a change of an uplink-downlink allocation state of the radio frame to the terminal. Further, the configuration information as a kind of downlink control information may be transmitted through a physical downlink control channel (PDCCH) similarly to other scheduling information and may be commonly transmitted to all terminals in a cell through a broadcast channel as broadcasting information.

The structure of the radio frame is just one example and the number subcarriers included in the radio frame or the number of slots included in the subframe and the number of OFDM symbols included in the slot may be variously changed.

FIG. 2 is a diagram illustrating a resource grid for one downlink slot in the wireless communication system to which the present invention can be applied.

Referring to FIG. 2, one downlink slot includes the plurality of OFDM symbols in the time domain. Herein, it is exemplarily described that one downlink slot includes 7 OFDM symbols and one resource block includes 12 subcarriers in the frequency domain, but the present invention is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

FIG. 3 illustrates a structure of a downlink subframe in the wireless communication system to which the present invention can be applied.

Referring to FIG. 3, a maximum of three fore OFDM symbols in the first slot of the subframe is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

FIG. 4 illustrates a structure of an uplink subframe in the wireless communication system to which the present invention can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe are allocated to the PUCCH for one terminal. RBs included in the RB pair occupy different subcarriers in two slots, respectively. The RB pair allocated to the PUCCH frequency-hops in a slot boundary.

Multi-Input Multi-Output (MIMO)

An MIMO technology uses multiple transmitting (Tx) antennas and multiple receiving (Rx) antennas by breaking from generally one transmitting antenna and one receiving antenna up to now. In other words, the MIMO technology is a technology for achieving capacity increment or capability enhancement by using a multiple input multiple output antenna at a transmitter side or a receiver side of the wireless communication system. Hereinafter, "MIMO" will be referred to as "multiple input multiple output antenna".

In more detail, the MIMO technology does not depend on one antenna path in order to receive one total message and completes total data by collecting a plurality of data pieces received through multiple antennas. Consequently, the MIMO technology may increase a data transfer rate within in a specific system range and further, increase the system range through a specific data transfer rate.

In next-generation mobile communication, since a still higher data transfer rate than the existing mobile communication is required, it is anticipated that an efficient multiple input multiple output technology is particularly required. In such a situation, an MIMO communication technology is a next-generation mobile communication technology which may be widely used in a mobile communication terminal and a relay and attracts a concern as a technology to overcome a limit of a transmission amount of another mobile communication according to a limit situation due to data communication extension, and the like.

Meanwhile, the multiple input multiple output (MIMO) technology among various transmission efficiency improvement technologies which have been researched in recent years as a method that may epochally improve a communication capacity and transmission and reception performance without additional frequency allocation or power increment has the largest attention in recent years.

FIG. 5 is a configuration diagram of a general multiple input multiple output (MIMO) communication system.

Referring to FIG. 5, when the number of transmitting antennas increases to NT and the number of receiving antennas increases to NR at the same time, since a theoretical channel transmission capacity increases in proportion to the number of antennas unlike a case using multiple antennas only in a transmitter or a receiver, a transfer rate may be improved and frequency efficiency may be epchally improved. In this case, the transfer rate depending on an increase in channel transmission capacity may theoretically increase to a value acquired by multiplying a maximum transfer rate (Ro) in the case using one antenna by a rate increase rate (Ri) given below.

$$R_i = \min(N_T, N_R) \quad \text{[Equation 1]}$$

That is, for example, in an MIMO communication system using four transmitting antennas and four receiving antennas, a transfer rate which is four times higher than a single antenna system may be acquired.

Such an MIMO antenna technology may be divided into a spatial diversity scheme increasing transmission reliability by using symbols passing through various channel paths and a spatial multiplexing scheme improving the transfer rate by simultaneously transmitting multiple data symbols by using multiple transmitting antennas. Further, a research into a scheme that intends to appropriately acquire respective advantages by appropriately combining two schemes is also a field which has been researched in recent years.

The respective schemes will be described below in more detail.

First, the spatial diversity scheme includes a space-time block coding series and a space-time Trelis coding series scheme simultaneously using a diversity gain and a coding gain. In general, the Trelis is excellent in bit error rate enhancement performance and code generation degree of freedom, but the space-time block code is simple in operational complexity. In the case of such a spatial diversity gain, an amount corresponding to a multiple (NT×NR) of the number (NT) of transmitting antennas and the number (NR) of receiving antennas may be acquired.

Second, the spatial multiplexing technique is a method that transmits different data arrays in the respective transmitting antennas and in this case, mutual interference occurs among data simultaneously transmitted from the transmitter in the receiver. The receiver receives the data after removing the interference by using an appropriate signal processing technique. A noise removing scheme used herein includes a maximum likelihood detection (MLD) receiver, a zero-forcing (ZF) receiver, a minimum mean square error (MMSE) receiver, a diagonal-bell laboratories layered space-time (D-BLAST), a vertical-bell laboratories layered space-time), and the like and in particular, when channel information may be known in the transmitter side, a singular value decomposition (SVD) scheme, and the like may be used.

Third, a technique combining the space diversity and the spatial multiplexing may be provided. When only the spatial diversity gain is acquired, the performance enhancement gain depending on an increase in diversity degree is gradually saturated and when only the spatial multiplexing gain is acquired, the transmission reliability deteriorates in the radio channel. Schemes that acquire both two gains while solving the problem have been researched and the schemes include a space-time block code (Double-STTD), a space-time BICM (STBICM), and the like.

In order to describe a communication method in the MIMO antenna system described above by a more detailed method, when the communication method is mathematically modeled, the mathematical modeling may be shown as below.

First, it is assumed that NT transmitting antennas and NR receiving antennas are present as illustrated in FIG. 5.

First, in respect to a transmission signal, when NT transmitting antennas are provided, since the maximum number of transmittable information is NT, NT may be expressed as a vector given below.

$$s = [s_1, s_2, \ldots, s_{N_T}]^T \quad \text{[Equation 2]}$$

Meanwhile, transmission power may be different in the respective transmission information s1, s2, . . . , sNT and in this case, when the respective transmission power is P1, P2, . . . , PNT, the transmission information of which the transmission power is adjusted may be expressed as a vector given below.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

Further, ŝ may be expressed as described below as a diagonal matrix P of the transmission power.

$$\hat{s} = \begin{bmatrix} P_1 & & 0 \\ & P_2 & \\ & & \ddots \\ 0 & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, the information vector ŝ of which the transmission power is adjusted is multiplied by a weight matrix W to constitute NT transmission signals x1, x2, . . . , xNT which are actually transmitted. Herein, the weight matrix serves to appropriately distribute the transmission information to the respective antennas according to a transmission channel situation, and the like. The transmission signals x1, x2, . . . , xNT may be expressed as below by using a vector x.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

Herein, wij represents a weight between the i-th transmitting antenna and j-th transmission information and W represents the weight as the matrix. The matrix W is called a weight matrix or a precoding matrix.

Meanwhile, the transmission signal x described above may be divided into transmission signals in a case using the spatial diversity and a case using the spatial multiplexing.

In the case using the spatial multiplexing, since different signals are multiplexed and sent, all elements of an information vector s have different values, while when the spatial diversity is used, since the same signal is sent through multiple channel paths, all of the elements of the information vector s have the same value.

Of course, a method mixing the spatial multiplexing and the spatial diversity may also be considered. That is, for example, a case may also be considered, which transmits the same signal by using the spatial diversity through three transmitting antennas and different signals are sent by the spatial multiplexing through residual transmitting antennas.

Next, when NR receiving antennas are provided, received signals y1, y2, . . . , yNR of the respective antennas are expressed as a vector y as described below.

$$y = [y_1, y_2, \ldots, y_{N_R}]^T \qquad \text{[Equation 6]}$$

Meanwhile, in the case of modeling the channel in the MIMO antenna communication system, respective channels may be distinguished according to transmitting and receiving antenna indexes and a channel passing through a receiving antenna i from a transmitting antenna j will be represented as hij. Herein, it is noted that in the case of the order of the index of hij, the receiving antenna index is earlier and the transmitting antenna index is later.

The multiple channels are gathered into one to be expressed even as vector and matrix forms. An example of expression of the vector will be described below.

FIG. 6 is a diagram illustrating a channel from multiple transmitting antennas to one receiving antenna.

As illustrated in FIG. 6, a channel which reaches receiving antenna I from a total of NT transmitting antennas may be expressed as below.

$$h_i^T = [h_{i1}, h_{i2}, \ldots, h_{iN_T}] \qquad \text{[Equation 7]}$$

Further, all of channels passing through NR receiving antennas from NT transmitting antennas may be shown as below through matrix expression shown in Equation given above.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \qquad \text{[Equation 8]}$$

Meanwhile, since additive white Gaussian noise (AWGN) is added after passing through a channel matrix H given above in an actual channel, white noises n1, n2, . . . , nNR added to NR receiving antennas, respectively are expressed as below.

$$n = [n_1, n_2, \ldots, n_{N_R}]^T \qquad \text{[Equation 9]}$$

Each of the transmission signal, the reception signal, the channel, and the white noise in the MIMO antenna communication system may be expressed through a relationship given below by modeling the transmission signal, the reception signal, the channel, and the white noise.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_i \\ \vdots \\ x_{N_T} \end{bmatrix} + \begin{bmatrix} n_1 \\ n_2 \\ \vdots \\ n_i \\ \vdots \\ n_{N_R} \end{bmatrix} = \qquad \text{[Equation 10]}$$

$$Hx + n$$

The numbers of rows and columns of the channel matrix H representing the state of the channel are determined by the numbers of transmitting and receiving antennas. In the case of the channel matrix H, the number of rows becomes equivalent to NR which is the number of receiving antennas and the number of columns becomes equivalent to NR which is the number of transmitting antennas. That is, the channel matrix H becomes an NR×NR matrix.

In general, a rank of the matrix is defined as the minimum number among the numbers of independent rows or columns. Therefore, the rank of the matrix may not be larger than the number of rows or columns. As an equation type example, the rank (rank(H)) of the channel matrix H is limited as below.

$$\text{rank}(H) \leq \min(N_T, N_R) \qquad \text{[Equation 11]}$$

Further, when the matrix is subjected to Eigen value decomposition, the rank may be defined as not 0 but the number of Eigen values among the Eigen values. By a similar method, when the rank is subjected to singular value decomposition, the rank may be defined as not 0 but the number of singular values. Accordingly, a physical meaning of the rank in the channel matrix may be the maximum number which may send different information in a given channel.

In the present specification, a 'rank' for MIMO transmission represents the number of paths to independently transmit the signal at a specific time and in a specific frequency resource and 'the number of layers' represents the number of signal streams transmitted through each path. In general, since the transmitter side transmits layers of the number corresponding to the number of ranks used for transmitting the signal, the rank has the same meaning as the number layers if not particularly mentioned.

Carrier Aggregation

A communication environment considered in embodiments of the present invention includes multi-carrier supporting environments. That is, a multi-carrier system or a carrier aggregation system used in the present invention means a system that aggregates and uses one or more component carriers (CCs) having a smaller bandwidth smaller than a target band at the time of configuring a target wideband in order to support a wideband.

In the present invention, multi-carriers mean aggregation of (alternatively, carrier aggregation) of carriers and in this case, the aggregation of the carriers means both aggregation between continuous carriers and aggregation between non-contiguous carriers. Further, the number of component carriers aggregated between the downlink and the uplink may be differently set. A case in which the number of downlink component carriers (hereinafter, referred to as 'DL CC') and the number of uplink component carriers (hereinafter, referred to as 'UL CC') are the same as each other is referred to as symmetric aggregation and a case in which the number of downlink component carriers and the number of uplink component carriers are different from each other is referred to as asymmetric aggregation. The carrier aggregation may be used mixedly with a term such as the carrier aggregation, the bandwidth aggregation, spectrum aggregation, or the like.

The carrier aggregation configured by combining two or more component carriers aims at supporting up to a bandwidth of 100 MHz in the LTE-A system. When one or more carriers having the bandwidth than the target band are combined, the bandwidth of the carriers to be combined may be limited to a bandwidth used in the existing system in order to maintain backward compatibility with the existing IMT system. For example, the existing 3GPP LTE system supports bandwidths of 1.4, 3, 5, 10, 15, and 20 MHz and a 3GPP LTE-advanced system (that is, LTE-A) may be configured to support a bandwidth larger than 20 MHz by using on the bandwidth for compatibility with the existing system. Further, the carrier aggregation system used in the preset invention may be configured to support the carrier aggregation by defining a new bandwidth regardless of the bandwidth used in the existing system.

The LTE-A system uses a concept of the cell in order to manage a radio resource.

The carrier aggregation environment may be called a multi-cell environment. The cell is defined as a combination of a pair of a downlink resource (DL CC) and an uplink resource (UL CC), but the uplink resource is not required. Therefore, the cell may be constituted by only the downlink resource or both the downlink resource and the uplink resource. When a specific terminal has only one configured serving cell, the cell may have one DL CC and one UL CC, but when the specific terminal has two or more configured serving cells, the cell has DL CCs as many as the cells and the number of UL CCs may be equal to or smaller than the number of DL CCs.

Alternatively, contrary to this, the DL CC and the UL CC may be configured. That is, when the specific terminal has multiple configured serving cells, a carrier aggregation environment having UL CCs more than DL CCs may also be supported. That is, the carrier aggregation may be appreciated as aggregation of two or more cells having different carrier frequencies (center frequencies). Herein, the described 'cell' needs to be distinguished from a cell as an area covered by the base station which is generally used.

The cell used in the LTE-A system includes a primary cell (PCell) and a secondary cell (SCell). The P cell and the S cell may be used as the serving cell. In a terminal which is in an RRC_CONNECTED state, but does not have the configured carrier aggregation or does not support the carrier aggregation, only one serving constituted by only the P cell is present. On the contrary, in a terminal which is in the RRC_CONNECTED state and has the configured carrier aggregation, one or more serving cells may be present and the P cell and one or more S cells are included in all serving cells.

The serving cell (P cell and S cell) may be configured through an RRC parameter. PhysCellId as a physical layer identifier of the cell has integer values of 0 to 503. SCellIndex as a short identifier used to identify the S cell has integer values of 1 to 7. ServCellIndex as a short identifier used to identify the serving cell (P cell or S cell) has the integer values of 0 to 7. The value of 0 is applied to the P cell and SCellIndex is previously granted for application to the S cell. That is, a cell having a smallest cell ID (alternatively, cell index) in ServCellIndex becomes the P cell.

The P cell means a cell that operates on a primary frequency (alternatively, primary CC). The terminal may be used to perform an initial connection establishment process or a connection re-establishment process and may be designated as a cell indicated during a handover process. Further, the P cell means a cell which becomes the center of control associated communication among serving cells configured in the carrier aggregation environment. That is, the terminal may be allocated with and transmit the PUCCH only in the P cell thereof and use only the P cell to acquire the system information or change a monitoring procedure. An evolved universal terrestrial radio access (E-UTRAN) may change only the P cell for the handover procedure to the terminal supporting the carrier aggregation environment by using an RRC connection reconfiguration message (RRC-ConnectionReconfigutaion) message of an upper layer including mobile control information (mobilityControlInfo).

The S cell means a cell that operates on a secondary frequency (alternatively, secondary CC). Only one P cell may be allocated to a specific terminal and one or more S cells may be allocated to the specific terminal. The S cell may be configured after RRC connection establishment is achieved and used for providing an additional radio resource. The PUCCH is not present in residual cells other than the P cell, that is, the S cells among the serving cells configured in the carrier aggregation environment. The E-UTRAN may provide all system information associated with a related cell which is in an RRC_CONNECTED state through a dedicated signal at the time of adding the S cells to the terminal that supports the carrier aggregation environment. A change of the system information may be controlled by releasing and adding the related S cell and in this case, the RRC connection reconfiguration (RRCConnectionReconfigutaion) message of the upper layer may be used. The E-UTRAN may perform having different parameters for each terminal rather than broadcasting in the related S cell.

After an initial security activation process starts, the E-UTRAN adds the S cells to the P cell initially configured during the connection establishment process to configure a network including one or more S cells. In the carrier aggregation environment, the P cell and the S cell may operate as the respective component carriers. In an embodiment described below, the primary component carrier (PCC) may be used as the same meaning as the P cell and the secondary component carrier (SCC) may be used as the same meaning as the S cell.

FIG. 7 illustrates examples of a component carrier and carrier aggregation in the wireless communication system to which the present invention can be applied.

FIG. 7a illustrates a single carrier structure used in an LTE system. The component carrier includes the DL CC and the UL CC. One component carrier may have a frequency range of 20 MHz.

FIG. 7b illustrates a carrier aggregation structure used in the LTE system. In the case of FIG. 7b, a case is illustrated, in which three component carriers having a frequency magnitude of 20 MHz are combined. Each of three DL CCs and three UL CCs is provided, but the number of DL CCs and the number of UL CCs are not limited. In the case of carrier aggregation, the terminal may simultaneously monitor three CCs, and receive downlink signal/data and transmit uplink signal/data.

When N DL CCs are managed in a specific cell, the network may allocate M (M≤N) DL CCs to the terminal. In this case, the terminal may monitor only M limited DL CCs and receive the DL signal. Further, the network gives L (L≤M≤N) DL CCs to allocate a primary DL CC to the terminal and in this case, UE needs to particularly monitor L DL CCs. Such a scheme may be similarly applied even to uplink transmission.

A linkage between a carrier frequency (alternatively, DL CC) of the downlink resource and a carrier frequency (alternatively, UL CC) of the uplink resource may be indicated by an upper-layer message such as the RRC message or the system information. For example, a combination of the DL resource and the UL resource may be configured by a linkage defined by system information block type 2 (SIB2). In detail, the linkage may mean a mapping relationship between the DL CC in which the PDCCH transporting a UL grant and a UL CC using the UL grant and mean a mapping relationship between the DL CC (alternatively, UL CC) in which data for the HARQ is transmitted and the UL CC (alternatively, DL CC) in which the HARQ ACK/NACK signal is transmitted.

Coordinated Multi-Point Transmission and Reception (COMP)

According to a demand of LTE-advanced, CoMP transmission is proposed in order to improve the performance of the system. The CoMP is also called co-MIMO, collaborative MIMO, network MIMO, and the like. It is anticipated that the CoMP will improves the performance of the terminal positioned at a cell edge and improve an average throughput of the cell (sector).

In general, inter-cell interference decreases the performance and the average cell (sector) efficiency of the terminal positioned at the cell edge in a multi-cell environment in which a frequency reuse index is 1. In order to alleviate the inter-cell interference, the LTE system adopts a simple passive method such as fractional frequency reuse (FFR) in the LTE system so that the terminal positioned at the cell edge has appropriate performance efficiency in an interference-limited environment. However, a method that reuses the inter-cell interference or alleviates the inter-cell interference as a signal (desired signal) which the terminal needs to receive is more preferable instead of reduction of the use of the frequency resource for each cell. The CoMP transmission scheme may be adopted in order to achieve the aforementioned object.

The CoMP scheme which may be applied to the downlink may be classified into a joint processing (JP) scheme and a coordinated scheduling/beamforming (CS/CB) scheme.

In the JP scheme, the data may be used at each point (base station) in a CoMP wise. The CoMP wise means a set of base stations used in the CoMP scheme. The JP scheme may be again classified into a joint transmission scheme and a dynamic cell selection scheme.

The joint transmission scheme means a scheme in which the signal is simultaneously transmitted through a plurality of points which are all or fractional points in the CoMP wise. That is, data transmitted to a single terminal may be simultaneously transmitted from a plurality of transmission points. Through the joint transmission scheme, the quality of the signal transmitted to the terminal may be improved regardless of coherently or non-coherently and interference with another terminal may be actively removed.

The dynamic cell selection scheme means a scheme in which the signal is transmitted from the single point through the PDSCH in the CoMP wise. That is, data transmitted to the single terminal at a specific time is transmitted from the single point and data is not transmitted to the terminal at another point in the CoMP wise. The point that transmits the data to the terminal may be dynamically selected.

According to the CS/CB scheme, the CoMP wise performs beamforming through coordination for transmitting the data to the single terminal. That is, the data is transmitted to the terminal only in the serving cell, but user scheduling/beamforming may be determined through coordination of a plurality of cells in the CoMP wise.

In the case of the uplink, CoMP reception means receiving the signal transmitted by the coordination among a plurality of points which are geographically separated. The CoMP scheme which may be applied to the uplink may be classified into a joint reception (JR) scheme and the coordinated scheduling/beamforming (CS/CB) scheme.

The JR scheme means a scheme in which the plurality of points which are all or fractional points receives the signal transmitted through the PDSCH in the CoMP wise. In the CS/CB scheme, only the single point receives the signal transmitted through the PDSCH, but the user scheduling/beamforming may be determined through the coordination of the plurality of cells in the CoMP wise.

Hybrid—Automatic Repeat and Request (HARQ)

The LTE physical layer supports the HARQ in the PDSCH and the PUSCH, and transmits the related acknowledgement (ACK) feedback in a separate control channel.

In the LTE FDD system, eight Stop-And-Wait (SAW) HARQ processes are supported on both the uplink and the downlink in accordance with a constant round-trip time (RTT) of 8 ms.

FIG. 8 is a diagram illustrating a downlink HARQ process in an LTE FDD system, and FIG. 9 is a diagram illustrating an uplink HARQ process in an LTE FDD system.

The respective HARQ processes are defined by a unique HARQ process identifier of 3 bit size, and individual soft buffer allocation for combination of retransmitted data is required for a reception end (that is, UE at the downlink HARQ process, and eNodeB at the uplink HARQ process).

In addition, it is defined that information such as a new data indicator (NDI), a redundancy version (RV) and a modulation and coding scheme (MCS) fields in the downlink control information for the HARQ processes. The NDI field is toggled whenever a new packet transmission is started. The RV field indicates the RV that is selected for a transmission and a retransmission. The MCS field indicates a modulation and coding method level.

The downlink HARQ process of the LTE system is an adaptive asynchronous scheme. Accordingly, the downlink control information for the HARQ process is explicitly accompanied per downlink transmission.

On the other hand, the uplink HARQ process of the LTE system is a synchronous scheme, and may be performed adaptively or non-adaptively. Since the uplink non-adaptive HARQ scheme does not accompany signaling of the explicit control information, the sequence such as previously set RV sequence (i.e., 0, 2, 3, 1, 0, 2, 3, 1, . . . ) is required for a continuous packet transmission. However, according to the uplink adaptive HARQ scheme, the RV is signaled explicitly. In order to minimize the control signaling, the uplink mode in which the RV (or the MCS) is combined with other control information is also supported.

Limited Buffer Rate Matching (LBRM)

Owing to the entire memory required for saving the Log-Likelihood Ratio (LLR) in order to support the HARQ process (throughout all HARQ processes), that is, the UE HARQ soft buffer size, the complexity in the UE implement is increased.

The object of the Limited Buffer Rate Matching (LBRM) is to maintain the peak data rates and to minimize the influence on the system performance, and in addition, to decrease the UE HARQ soft buffer size. The LBRM reduces the length of virtual circular buffer of the code block segments for the transmission block (TB) that has a size greater than a predetermined size. Using the LBRM, the mother code rate for the TB becomes the function of UE soft buffer size that is allocated to the TB size and the TB. For example, for the UE category that does not support the FDD operation and the UE of the lowest category (e.g., UE categories 1 and 2 that do not support the spatial multiplexing), the limit on the buffer is transparent. That is, the LBRM does not cause the reduction of the soft buffer. In the case of the UE of high category (i.e., UE categories 3, 4 and 5), the size of soft buffer is calculated by assuming the buffer decrease of 50% that corresponds to two thirds of the mother code rate for eight HARQ processes and the maximum TB. Since an eNB knows the soft buffer capacity of a UE, the code bit is transmitted in the virtual circular buffer (VCB) that may be stored in the HARQ soft buffer of the UE for all of the given TB (re)transmissions.

Synchronization Signal (SS)

A UE performs the initial cell search procedure including acquisition of time and frequency synchronization with the cell and detection of a physical cell ID of the cell. To this end, the UE may receive, from the eNB, synchronization signals, for example, a primary synchronization signal (PSS) and a secondary synchronization signal (SSS), establish synchronization with the eNB, and acquire information such as a cell ID.

FIG. 10 illustrates a radio frame structure for transmitting the Synchronization Signal (SS) in a wireless communication system to which the present invention may be applied.

Particularly, FIG. 10 illustrates the radio frame structure for transmitting the SS and the PBCH in the frequency division duplex (FDD). FIG. 10(a) illustrates a transmission position of the SS and the PBCH in the radio frame configured with a normal cyclic prefix (CP), and FIG. 10(b) illustrates a transmission position of the SS and the PBCH in the radio frame configured with an extended CP.

SSs are divided into a PSS and an SSS. The PSS is used to obtain the time domain synchronization and/or the frequency domain synchronization such as the OFDM symbol synchronization, the slot synchronization, and so on, and the SSS is used to obtain the frame synchronization, a cell group ID and/or a CP configuration (i.e., usage information on the normal CP or the extended CP) of a cell.

Referring to FIG. 10, the PSS and the SSS in the time domain are transmitted on two OFDM symbols in every radio frame, respectively. Specifically, the SSs are transmitted on the first slot of subframe 0 and the first slot of subframe 5, respectively, in consideration of a Global System for Mobile communication (GSM) frame length, 4.6 ms, for facilitation of inter radio access technology (RAT) measurement. In particular, the PSS is transmitted on the last OFDM symbol of the first slot of subframe 0 and the last OFDM symbol of the first slot of subframe 5, and the SSS is transmitted on the second last OFDM symbol of the first slot of subframe 0 and the second last OFDM symbol of the first slot of subframe 5.

The boundary of a corresponding radio frame may be detected through the SSS. The PSS is transmitted on the last OFDM symbol of a corresponding slot, the SSS is transmitted on the immediately before the OFDM symbol of the PSS. The transmission diversity scheme of the SS uses only a single antenna port, and is not separately defined in the standard. That is, a single antenna port transmission scheme or a transmission scheme transparent to the UE (e.g., the precoding vector switching (PVS), the time switched diversity (TSTD), and the cyclic delay diversity (CDD)) may be used for the transmission diversity of the SS.

The PSS is transmitted on every 5 ms, and accordingly, the UE may recognize that the corresponding subframe is one of subframe 0 and subframe 5 by detecting the PSS, but may not specifically identify the subframe as subframe 0 or subframe 5. Accordingly, the UE is not capable of recognizing a boundary of radio frames with the PSS alone. That is, the frame synchronization cannot be acquired with the PSS alone. The UE detects the boundary of radio frames by detecting the SSS transmitted twice with different sequences in one radio frame.

In the frequency domain, the PSS and the SSS are mapped to six RBs positioned on the center of the downlink system bandwidth. In a downlink, the entire RBs includes different number of RBs (e.g., 6 RBs to 110 RBs) depending on the system bandwidth, but a UE may detect the PSS and the SSS in the same way since the PSS and the SSS are mapped to 6 RBs positioned on the center of the downlink system bandwidth.

Both of the PSS and the SSS include the sequence that has the length of 62. Accordingly, the PSS and the SSS are mapped to 62 subcarriers on the center, which are located at opposite sides of the DC subcarrier among 6 RBs, and the DC subcarrier and each of 5 subcarriers located at opposite side ends are not used.

A UE may obtain the physical layer cell ID from a specific sequence of the PSS and the SSS. That is, the combination of 3 PSSs and 168 SSSs, the SS may represent total 504 specific physical layer cell IDs.

In other words, the physical layer cell IDs are grouped into 168 physical-layer cell-ID groups that include three specific IDs in each group such that each of the physical layer cell IDs becomes a part of only one physical-layer cell-ID group. Accordingly, the physical layer cell ID Ncell ID (=3N(1) ID+N(2) ID) is specifically defined by the number N(1) ID within the range of 0 to 167 that represents the physical-layer cell-ID group and the number N(2) ID within the range of 0 to 2 that represents the physical-layer ID in the physical-layer cell-ID group.

A UE may know one of three specific physical-layer IDs by detecting the PSS and may recognize one of 168 physical layer cell IDs related to the physical-layer ID by detecting the SSS.

The SSS is generated based on the M-sequence. Each SSS sequence is generated by concatenating SSC 1 sequence and SSC 2 sequence, which is two interleaved sequences, of which length is 31 in the frequency domain. By combining two sequences, 168 cell group IDs are transmitted. The m-sequence as the SSS sequence is robust in the frequency selective environment, and may be transformed to the high-speed m-sequence using the Fast Hadamard Transform, thereby the amount of operations being decreased. In addition, the configuration of SSS using two short codes is proposed to decrease the amount of operations of UE.

FIG. 11 illustrates a structure that two sequences for generating the secondary synchronization signal are mapped in the physical region with being interleaved.

When two m-sequences used for generating the SSS sign are defined by SSS 1 and SSS 2, in the case that the SSS (SSS 1, SSS 2) of subframe 0 transmits the cell group ID with the combination, the SSS (SSS 2, SSS 1) of subframe 5 is transmitted with being swapped, thereby distinguishing the 10 ms frame boundary. In this case, the SSS sign uses the generation polynomial $x^5+x^2+1$, and total 31 signs may be generated through the circular shift.

In order to improve the reception performance, two different PSS-based sequences are defined and scrambled to the SSS, and scrambled to SSS 1 and SSS 2 with different sequences. Later, by defining the SSS 1-based scrambling sign, the scrambling is performed to SSS 2. In this case, the sign of SSS is exchanged in a unit of 5 ms, but the PSS-based scrambling sign is not exchanged. The PSS-based scrambling sign is defined by six circular shift versions according to the PSS index in the m-sequence generated from the generation polynomial $x^5+x^2+1$, and the SSS 1-based scrambling sign is defined by eight circular shift versions according to the SSS 1 index in the m-sequence generated from the generation polynomial $x^5+x^4+x^2+x^1+1$.

Reference Signal (RS)

In the wireless communication system, since the data is transmitted through the radio channel, the signal may be distorted during transmission. In order for the receiver side to accurately receive the distorted signal, the distortion of the received signal needs to be corrected by using channel information. In order to detect the channel information, a signal transmitting method know by both the transmitter side and the receiver side and a method for detecting the channel information by using an distortion degree when the signal is transmitted through the channel are primarily used. The aforementioned signal is referred to as a pilot signal or a reference signal (RS).

Recently, when packets are transmitted in most of mobile communication systems, multiple transmitting antennas and multiple receiving antennas are adopted to increase transceiving efficiency rather than a single transmitting antenna and a single receiving antenna. When the data is transmitted and received by using the MIMO antenna, a channel state between the transmitting antenna and the receiving antenna need to be detected in order to accurately receive the signal. Therefore, the respective transmitting antennas need to have individual reference signals.

Reference signal in a wireless communication system can be mainly categorized into two types. In particular, there are a reference signal for the purpose of channel information acquisition and a reference signal used for data demodulation. Since the object of the former reference signal is to enable a UE (user equipment) to acquire a channel information in DL (downlink), the former reference signal should be transmitted on broadband. And, even if the UE does not receive DL data in a specific subframe, it should perform a channel measurement by receiving the corresponding reference signal. Moreover, the corresponding reference signal can be used for a measurement for mobility management of a handover or the like. The latter reference signal is the reference signal transmitted together when a base station transmits DL data. If a UE receives the corresponding reference signal, the UE can perform channel estimation, thereby demodulating data. And, the corresponding reference signal should be transmitted in a data transmitted region.

The DL reference signals are categorized into a common reference signal (CRS) shared by all terminals for an acquisition of information on a channel state and a measurement associated with a handover or the like and a dedicated reference signal (DRS) used for a data demodulation for a specific terminal. Information for demodulation and channel measurement may be provided by using the reference signals. That is, the DRS is used only for data demodulation only, while the CRS is used for two kinds of purposes including channel information acquisition and data demodulation.

The receiver side (that is, terminal) measures the channel state from the CRS and feeds back the indicators associated with the channel quality, such as the channel quality indicator (Cal), the precoding matrix index (PMI), and/or the rank indicator (RI) to the transmitting side (that is, base station). The CRS is also referred to as a cell-specific RS. On the contrary, a reference signal associated with a feed-back of channel state information (CSI) may be defined as CSI-RS.

The DRS may be transmitted through resource elements when data demodulation on the PDSCH is required. The terminal may receive whether the DRS is present through the upper layer and is valid only when the corresponding PDSCH is mapped. The DRS may be referred to as the UE-specific RS or the demodulation RS (DMRS).

FIG. 12 illustrates a reference signal pattern mapped to a downlink resource block pair in the wireless communication system to which the present invention can be applied.

Referring to FIG. 12, as a unit in which the reference signal is mapped, the downlink resource block pair may be expressed by one subframe in the timedomain×12 subcarriers in the frequency domain. That is, one resource block pair has a length of 14 OFDM symbols in the case of a normal cyclic prefix (CP) (FIG. 12a) and a length of 12 OFDM symbols in the case of an extended cyclic prefix (CP) (FIG. 12b). Resource elements (REs) represented as '0', '1', '2', and '3' in a resource block lattice mean the positions of the CRSs of antenna port indexes '0', '1', '2', and '3', respectively and resource elements represented as 'D' means the position of the DRS.

Hereinafter, when the CRS is described in more detail, the CRS is used to estimate a channel of a physical antenna and distributed in a whole frequency band as the reference signal which may be commonly received by all terminals positioned in the cell. That is, the CRS is transmitted in each subframe across a broadband as a cell-specific signal. Further, the CRS may be used for the channel quality information (CSI) and data demodulation.

The CRS is defined as various formats according to an antenna array at the transmitter side (base station). The RSs are transmitted based on maximum 4 antenna ports depending on the number of transmitting antennas of a base station in the 3GPP LTE system (for example, release-8). The transmitter side has three types of antenna arrays of three single transmitting antennas, two transmitting antennas, and four transmitting antennas. For instance, in case that the number of the transmitting antennas of the base station is 2, CRSs for antenna #1 and antenna #2 are transmitted. For another instance, in case that the number of the transmitting antennas of the base station is 4, CRSs for antennas #1 to #4 are transmitted.

When the base station uses the single transmitting antenna, a reference signal for a single antenna port is arrayed.

When the base station uses two transmitting antennas, reference signals for two transmitting antenna ports are arrayed by using a time division multiplexing (TDM) scheme and/or a frequency division multiplexing (FDM) scheme. That is, different time resources and/or different frequency resources are allocated to the reference signals for two antenna ports which are distinguished from each other.

Moreover, when the base station uses four transmitting antennas, reference signals for four transmitting antenna ports are arrayed by using the TDM and/or FDM scheme. Channel information measured by a downlink signal receiving side (terminal) may be used to demodulate data transmitted by using a transmission scheme such as single transmitting antenna transmission, transmission diversity, closed-loop spatial multiplexing, open-loop spatial multiplexing, or multi-user MIMO.

In the case where the MIMO antenna is supported, when the reference signal is transmitted from a specific antenna port, the reference signal is transmitted to the positions of specific resource elements according to a pattern of the reference signal and not transmitted to the positions of the specific resource elements for another antenna port. That is, reference signals among different antennas are not duplicated with each other.

A rule of mapping the CRS to the resource block is defined as below.

$$k = 6m + (v + v_{shift}) \bmod 6 \quad \text{[Equation 12]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 12, k and l represent the subcarrier index and the symbol index, respectively and p represents the antenna port. $N_{symb}^{DL}$ represents the number of OFDM symbols in one downlink slot and $N_{RB}^{DL}$ represents the number of radio resources allocated to the downlink. $n_s$ represents a slot index and, $N_{ID}^{cell}$ represents a cell ID. mod represents a modulo operation. The position of the reference signal varies depending on the $v_{shift}$ value in the frequency domain. Since $v_{shift}$ depends on the cell ID, the position of the reference signal has various frequency shift values according to the cell.

In more detail, the position of the CRS may be shifted in the frequency domain according to the cell in order to improve channel estimation performance through the CRS. For example, when the reference signal is positioned at an interval of three subcarriers, reference signals in one cell are allocated to a 3k-th subcarrier and a reference signal in another cell is allocated to a 3k+1-th subcarrier. In terms of one antenna port, the reference signals are arrayed at an interval of six resource elements in the frequency domain and separated from a reference signal allocated to another antenna port at an interval of three resource elements.

In the time domain, the reference signals are arrayed at a constant interval from symbol index 0 of each slot. The time interval is defined differently according to a cyclic shift length. In the case of the normal cyclic shift, the reference signal is positioned at symbol indexes 0 and 4 of the slot and in the case of the extended CP, the reference signal is positioned at symbol indexes 0 and 3 of the slot. A reference signal for an antenna port having a maximum value between two antenna ports is defined in one OFDM symbol. Therefore, in the case of transmission of four transmitting antennas, reference signals for reference signal antenna ports 0 and 1 are positioned at symbol indexes 0 and 4 (symbol indexes 0 and 3 in the case of the extended CP) and reference signals for antenna ports 2 and 3 are positioned at symbol index 1 of the slot. The positions of the reference signals for antenna ports 2 and 3 in the frequency domain are exchanged with each other in a second slot.

Hereinafter, when the DRS is described in more detail, the DRS is used for demodulating data. A precoding weight used for a specific terminal in the MIMO antenna transmission is used without a change in order to estimate a channel associated with and corresponding to a transmission channel transmitted in each transmitting antenna when the terminal receives the reference signal.

The 3GPP LTE system (for example, release-8) supports a maximum of four transmitting antennas and a DRS for rank 1 beamforming is defined. The DRS for the rank 1 beamforming also means a reference signal for antenna port index 5.

A rule of mapping the DRS to the resource block is defined as below. Equation 13 shows the case of the normal CP and Equation 14 shows the case of the extended CP.

$$k = (k') \bmod N_{sc}^{RB} + N_{sc}^{RB} \cdot n_{PRB} \quad \text{[Equation 13]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \quad \text{[Equation 4]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 13 and 14, k and l represent the subcarrier index and the symbol index, respectively and p represents the antenna port. $N_{sc}^{RB}$ represents the size of the resource block in the frequency domain and is expressed as the number of subcarriers. $n_{PRB}$ represents the number of physical resource blocks. $N_{RB}^{PDSCH}$ represents a frequency band of the resource block for the PDSCH transmission. ns represents the slot index and $N_{ID}^{cell}$ represents the cell ID. mod represents the modulo operation. The position of the reference signal varies depending on the $v_{shift}$ value in the frequency domain. Since $v_{shift}$ depends on the cell ID, the position of the reference signal has various frequency shift values according to the cell.

The LTE-A system which is an evolved version of the LTE system should support maximum eight transmitting antennas for downlink transmission. Accordingly, reference signals for maximum eight transmitting antennas should also be supported. In the LTE system, since the downlink reference signals are defined for maximum four antenna ports, if the base station includes four or more downlink transmitting antennas and maximum eight downlink transmitting antennas in the LTE-A system, the reference signals for these antenna ports should be defined additionally. The reference signals for maximum eight transmitting antenna ports should be designed for two types of reference signals, i.e., the reference signal for channel measurement and the reference signal for data demodulation.

One of important considerations in designing the LTE-A system is the backward compatibility. That is, the backward compatibility means that the LTE user equipment should be operated normally even in the LTE-A system without any problem and the LTE-A system should also support such normal operation. In view of reference signal transmission, the reference signals for maximum eight transmitting antenna ports should be defined additionally in the time-frequency domain to which CRS defined in the LTE is transmitted on full band of each subframe. However, in the LTE-A system, if reference signal patterns for maximum eight transmitting antennas are added to full band per subframe in the same manner as the CRS of the existing LTE system, the RS overhead becomes too great.

Accordingly, the reference signal designed newly in the LTE-A system may be divided into two types. Examples of the two types of reference signals include a channel state information-reference signal (CSI-RS) (or may be referred to as channel state indication-RS) for channel measurement for selection of modulation and coding scheme (MCS) and a precoding matrix index (PMI), and a data demodulation-reference signal (DM-RS) for demodulation of data transmitted to eight transmitting antennas.

The CSI-RS for the channel measurement purpose is designed for channel measurement mainly unlike the existing CRS used for channel measurement, handover measurement, and data demodulation. The CSI-RS may also be used for handover measurement. Since the CSI-RS is transmitted only to obtain channel state information, it may not be transmitted per subframe unlike the CRS of the existing LTE system. Accordingly, in order to reduce overhead, the CSI-RS may be intermittently be transmitted on the time axis.

The DM-RS is dedicatedly transmitted to the UE which is scheduled in the corresponding time-frequency domain for data demodulation. In other words, the DM-RS of a specific UE is only transmitted to the region where the corresponding user equipment is scheduled, i.e., the time-frequency domain that receives data.

In the LTE-A system, an eNB should transmit the CSI-RSs for all the antenna ports. Since the transmission of CSI-RSs for up to eight transmission antenna ports in every subframe leads to too much overhead, the CSI-RSs should be transmitted intermittently along the time axis, thereby reducing CSI-RS overhead. Therefore, the CSI-RSs may be transmitted periodically at every integer multiple of one subframe, or in a predetermined transmission pattern. The CSI-RS transmission period or pattern of the CSI-RSs may be configured by the eNB.

In order to measure the CSI-RSs, a UE should have knowledge of the information for each of the CSI-RS antenna ports in the cell to which the UE belong such as the transmission subframe index, the time-frequency position of the CSI-RS resource element (RE) in the transmission subframe, the CSI-RS sequence, and the like.

In the LTE-A system, an eNB should transmit each of the CSI-RSs for maximum eight antenna ports, respectively. The resources used for transmitting the CSI-RS of different antenna ports should be orthogonal. When an eNB transmits the CSI-RS for different antenna ports, by mapping the CSI-RS for each of the antenna ports to different REs, the resources may be orthogonally allocated in the FDM/TDM scheme. Otherwise, the CSI-RSs for different antenna ports may be transmitted in the CDM scheme with being mapped to the mutually orthogonal codes.

When an eNB notifies the information of the CSI-RS to the UE in its own cell, the information of the time-frequency in which the CSI-RS for each antenna port is mapped should be notified. Particularly, the information includes the subframe numbers on which the CSI-RS is transmitted, the period of the CSI-RS being transmitted, the subframe offset in which the CSI-RS is transmitted, the OFDM symbol number in which the CSI-RS RE of a specific antenna is transmitted, the frequency spacing, the offset or shift value of RE on the frequency axis.

FIG. 13 illustrates a periodic transmission scheme of CSI-RS in a wireless communication system to which the present invention may be applied.

As shown in FIG. 13, for an eNB that transmits the CSI-RS, the transmission period of the corresponding eNB is 10 (ms or subframes), and the transmission offset of the CSI-RS is 3 (subframes). The eNB has different offset values such that the CSI-RS of several cells should be evenly distributed on the time. The eNB in which the CSI-RS is transmitted in the period of 10 ms has ten offset values of 0 to 9. The offset values represent the value of subframes on which the eNB that has a specific period actually starts the CSI-RS transmission. When the eNB notifies the period and the offset value of the CSI-RS to a UE, the UE measures the CSI-RS of the eNB on the corresponding position using the value and reports the information such as CQI/PMI/RI, etc. to the eNB. The all types of the information related to the CSI-RS are cell-specific information.

FIG. 14 illustrates an aperiodic transmission scheme of CSI-RS in a wireless communication system to which the present invention may be applied.

FIG. 14 exemplifies the scheme that the CSI-RS is transmitted with a transmission subframe pattern. The CSI-RS transmission pattern includes 10 subframes, and whether to transmit the CSI-RS is designated by 1 bit indicator in each subframe.

Generally, following two schemes are considered as the scheme that an eNB notifies the CSI-RS configuration to a UE.

First, a first scheme of using the Dynamic BCH (DBCH) signaling may be considered.

The first scheme is the scheme that an eNB broadcasts the information of the CSI-RS configuration to UEs. In the LTE system, when an eNB notifies the contents for the system information to UEs, the corresponding information is transmitted to the Broadcasting Channel (BCH), normally. However, in the case that there are too much contents and it is unable to transmit all of the contents to the BCH, the contents are transmitted in the same way of transmitting normal data, but the PDCCH of the corresponding data is transmitted by masking CRC using the System information RNTI (SI-RNTI), not a specific UE ID (e.g., C-RNTI). And, the actual system information is transmitted to the PDSCH region like the normal unicast data. Then, all of the UE in a cell decodes the PDCCH using the SI-RNTI, and acquires the system information by decoding the PDSCH indicated by the PDCCH. Such a broadcast scheme is also called the Dynamic BCH (DBCH), distinguished from the Physical BCH (PBCH) scheme that is normal broadcast scheme.

The system information broadcasted in the LTE system is divided into two types, largely: The Master Information Block (MIB) transmitted to the PBCH and the System Information Block (SIB) transmitted to the PDSCH with being multiplexed with the normal unicast data. In the LTE system, since the information transmitted in SIB type 1 to SIB type 8 (SIB 1~SIB 8) is already defined, the CSI-RS configuration is transmitted in SIB 9, SIB 10, and so on, that are newly introduced in the LTE-A system.

Next, a second scheme using the RRC signaling may be considered.

The second scheme is the scheme that an eNB notifies the CSI-RS configuration to each of UEs using the dedicated RRC signaling. During the process that a UE establishes a connection to the eNB through an initial access or the handover, the eNB notifies the CSI-RS configuration to the corresponding UE through the RRC signaling. Otherwise, the eNB notifies the CSI-RS configuration through an RRC signaling message that requires a channel state feedback based on the CSI-RS measurement to the UE.

The CSI-RS-Config information element (IE) is used for specifying the CSI-RS configuration.

Table 2 exemplifies the CSI-RS-Config IE.

TABLE 2

```
-- ASN1START
CSI-RS-Config-r10 ::=    SEQUENCE {
    csi-RS-r10              CHOICE {
        release                 NULL,
        setup                   SEQUENCE {
            antennaPortsCount-r10   ENUMERATED
                                    {an1, an2, an4, an8},
            resourceConfig-r10      INTEGER (0..31),
            subframeConfig-r10      INTEGER (0..154),
            p-C-r10                 INTEGER (-8..15)
        }
    }                                           OPTIONAL,   --
Need ON
    zeroTxPowerCSI-RS-r10   CHOICE {
        release                 NULL,
        setup                   SEQUENCE {
            zeroTxPowerResourceConfigList-r10  BIT STRING (SIZE (16)),
            zeroTxPowerSubframeConfig-r10      INTEGER (0..154)
        }
    }                                           OPTIONAL    --
Need ON
}
-- ASN1STOP
```

Referring to Table 2, the 'antennaPortsCount' field indicates the number of antenna ports used for transmitting the CSI-RS. The 'resourceConfig' field indicates the CSI-RS configuration. The 'SubframeConfig' field and the 'zeroTx-PowerSubframeConfig' field indicate the subframe configuration ($I_{CSI-RS}$) on which the CSI-RS is transmitted.

The 'zeroTxPowerResourceConfigList' field indicates the zero-power (ZP) CSI-RS configuration. In the bitmap of 16 bit that configures the 'zeroTxPowerResourceConfigList' f field, the CSI-RS configuration that corresponds to the bit configured as '1' may be configured as the ZP CSI-RS.

The 'p-c' field represents the parameter ($P_c$) assumed by a ratio of the PDSCH Energy Per Resource Element (EPRE) and the CSI-RS EPRE.

The CSI-RS is transmitted through 1, 2, 4 or 8 antenna ports. In this case, the antenna port which is used is p=15, p=15,16, p=15, . . . ,18, or p=15, . . . ,22. The CSI-RS may be defined only for the subcarrier interval Δf=15 kHz.

The CSI-RS sequence may be generated by Equation 15 below.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{[Equation 15]}$$

$$m = 0, 1, \ldots, N_{RB}^{max,DL} - 1$$

Herein, $r_{l,n_s}(m)$ represents the generated CSI-RS sequence, c(i) represents the pseudo-random, $n_s$ is a slot number in a radio frame, l represents an OFDM symbol number in a slot, and $N_{RB}^{max,DL}$ represents the maximum RB number in a downlink bandwidth.

The pseudo-random sequence generator is initialized in every OFDM start as represented by Equation 16 below.

$$c_{init} = 2^{10} \cdot (7 \cdot (n_s+1)+l+1) \cdot (2 \cdot N_{ID}^{cell}+1) + 2 \cdot N_{ID}^{cell} + N_{CP} \quad \text{[Equation 16]}$$

In Equation 16, $N_{ID}^{cell}$ represents the cell ID, NCP=1 in the case of the normal CP and NCP=0 in the case of the extended CP.

In the subframe configured to transmit the CSI-RS, the CSI-RS sequence $r_{l,n_s}(m)$ generated through Equation 15 is mapped to the complex-valued modulation symbol $a_{k,l}^{(p)}$ that is used as a reference symbol on each antenna port (p) as represented by Equation 17 below.

$$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ normal cyclic prefix} \\ -3 & \text{for } p \in \{17, 18\}, \text{ normal cyclic prefix} \\ -6 & \text{for } p \in \{19, 20\}, \text{ normal cyclic prefix} \\ -9 & \text{for } p \in \{21, 22\}, \text{ normal cyclic prefix} \end{cases} \quad \text{[Equation 17]}$$

$$l = l' + \begin{cases} l'' & \text{CSI reference signal configurations } 0-19, \\ & \text{normal cyclic prefix} \\ 2l'' & \text{CSI reference signal configurations } 20-31, \\ & \text{normal cyclic prefix} \\ l'' & \text{CSI reference signal configurations } 0-27, \\ & \text{extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 17 above, (k', l') (herein, k' is a subcarrier index in a resource block, and l' represents an OFDM symbol index in a slot) and the condition of $n_s$ is determined according to the CSI-RS configuration shown in Table 3 or Table 4 below.

Table 3 exemplifies the mapping of (k', l') according to the CSI-RS configuration for the normal CP.

TABLE 3

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 0 | (9, 5) | 0 | (9, 5) | 0 | (9, 5) | 0 |
| 1 | (11, 2) | 1 | (11, 2) | 1 | (11, 2) | 1 |
| 2 | (9, 2) | 1 | (9, 2) | 1 | (9, 2) | 1 |
| 3 | (7, 2) | 1 | (7, 2) | 1 | (7, 2) | 1 |
| 4 | (9, 5) | 1 | (9, 5) | 1 | (9, 5) | 1 |
| 5 | (8, 5) | 0 | (8, 5) | 0 | | |
| 6 | (10, 2) | 1 | (10, 2) | 1 | | |
| ... | | | | | | |
| 18 | (3, 5) | 1 | | | | |
| 19 | (2, 5) | 1 | | | | |
| 20 | (11, 1) | 1 | (11, 1) | 1 | (11, 1) | 1 |
| 21 | (9, 1) | 1 | (9, 1) | 1 | (9, 1) | 1 |
| 22 | (7, 1) | 1 | (7, 1) | 1 | (7, 1) | 1 |
| 23 | (10, 1) | 1 | (10, 1) | 1 | | |
| ... | | | | | | |
| 29 | (2, 1) | 1 | | | | |
| 30 | (1, 1) | 1 | | | | |
| 31 | (0, 1) | 1 | | | | |

Table 4 exemplifies the mapping of (k', l') according to the CSI-RS configuration for the extended CP.

TABLE 4

| CSI reference signals configuration | Number of CSI reference signal configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 0 | (11, 4) | 0 | (11, 4) | 0 | (11, 4) | 0 |
| 1 | (9, 4) | 0 | (9, 4) | 0 | (9, 4) | 0 |
| 2 | (10, 4) | 1 | (10, 4) | 1 | (10, 4) | 1 |
| 3 | (9, 4) | 1 | (9, 4) | 1 | (9, 4) | 1 |
| 4 | (5, 4) | 0 | (5, 4) | 0 | | |
| 5 | (3, 4) | 0 | (3, 4) | 0 | | |
| 6 | (4, 4) | 1 | (4, 4) | 1 | | |
| 7 | (3, 4) | 1 | (3, 4) | 1 | | |
| 8 | (8, 4) | 0 | | | | |
| ... | | | | | | |
| 17 | (10, 1) | 1 | (10, 1) | 1 | (10, 1) | 1 |
| 18 | (9, 1) | 1 | (9, 1) | 1 | (9, 1) | 1 |
| 19 | (5, 1) | 1 | (5, 1) | 1 | | |
| 20 | (4, 1) | 1 | (4, 1) | 1 | | |
| ... | | | | | | |
| 25 | (2, 1) | 1 | | | | |
| 26 | (1, 1) | 1 | | | | |
| 27 | (0, 1) | 1 | | | | |

Referring to Table 3 and Table 4, for the CSI-RS transmission, in order to decrease the inter-cell interference (ICI) in the multi-cell environment including the heterogeneous network (HetNet) environment, different configurations of maximum 32 (in the case of normal CP) or maximum 28 (in the case of extended CP) are defined.

The CSI-RS configuration is different depending on the number of antenna ports in a cell and the CP, neighbor cells may have different configurations to the maximum. In addition, the CSI-RS configuration may be divided into the case of being applied to both the FDD frame and the TDD frame and the case of being applied to only the TDD frame.

Based on Table 3 and Table 4, (k', l') and $n_s$ are determined according to the CSI-RS configuration. By applying these values to Equation 19, the time-frequency resource that each CSI-RS antenna port uses for transmitting the CSI-RS is determined.

FIG. 15 is a diagram illustrating the CSI-RS configuration in a wireless communication system to which the present invention may be applied.

Particularly, FIG. 15 exemplifies the CSI-RS configuration (i.e., the case of normal CP) according to Equation 19 and Table 3.

FIG. 15(a) shows twenty CSI-RS configurations that are usable in the CSI-RS transmission through one or two CSI-RS antenna ports, and FIG. 15(b) shows ten CSI-RS configurations that are usable by four CSI-RS antenna ports. FIG. 15(c) shows five CSI-RS configurations that are usable in the CSI-RS transmission through eight CSI-RS antenna ports.

As such, according to each CSI-RS configuration, the radio resource (i.e., RE pair) in which the CSI-RS is transmitted is determined.

When one or two CSI-RS antenna ports are configured for transmitting the CSI-RS for a specific cell, the CSI-RS is transmitted on the radio resource according to the configured CSI-RS configuration among twenty CSI-RS configurations shown in FIG. 15(a).

Similarly, when four CSI-RS antenna ports are configured for transmitting the CSI-RS for a specific cell, the CSI-RS is transmitted on the radio resource according to the configured CSI-RS configuration among ten CSI-RS configurations shown in FIG. 15(b). In addition, when eight CSI-RS antenna ports are configured for transmitting the CSI-RS for a specific cell, the CSI-RS is transmitted on the radio resource according to the configured CSI-RS configuration among five CSI-RS configurations shown in FIG. 15(c).

The CSI-RS for each of the antenna ports is transmitted with being CDM to the same radio resource for each of two antenna ports (i.e., {15,16}, {17,18}, {19,20}, {21,22}). As an example of antenna ports 15 and 16, although the respective CSI-RS complex symbols are the same for antenna ports 15 and 16, the CSI-RS complex symbols are mapped to the same radio resource with being multiplied by different orthogonal codes (e.g., Walsh code). To the complex symbol of the CSI-RS for antenna port 15, [1, 1] is multiplied, and [1, −1] is multiplied to the complex symbol of the CSI-RS for antenna port 16, and the complex symbols are mapped to the same radio resource. This procedure is the same for antenna ports {17,18}, {19,20} and {21,22}.

A UE may detect the CSI-RS for a specific antenna port by multiplying a code multiplied by the transmitted code. That is, in order to detect the CSI-RS for antenna port 15, the multiplied code [1 1] is multiplied, and in order to detect the CSI-RS for antenna port 16, the multiplied code [1 −1] is multiplied.

Referring to FIGS. 15(a) to (c), when a radio resource is corresponding to the same CSI-RS configuration index, the radio resource according to the CSI-RS configuration including a large number of antenna ports includes the radio resource according to the CSI-RS configuration including a small number of antenna ports. For example, in the case of CSI-RS configuration 0, the radio resource for eight antenna ports includes all of the radio resource for four antenna ports and one or two antenna ports.

A plurality of CSI-RS configurations may be used in a cell. Zero or one CSI-RS configuration may be used for the non-zero power (NZP) CSI-RS, and zero or several CSI-RS configurations may be used for the zero power CSI-RS.

A UE presumes the zero power transmission for the REs (except the case of being overlapped with the RE that presumes the NZP CSI-RS that is configured by a high layer) that corresponds to four CSI-RS column in Table 3 and Table 4 above, for every bit that is configured as '1' in the Zero Power CSI-RS (ZP-CSI-RS) which is the bitmap of 16 bits configured by a high layer. The Most Significant Bit (MSB) corresponds to the lowest CSI-RS configuration index, and the next bit in the bitmap corresponds to the next CSI-RS configuration index in order.

The CSI-RS is transmitted in the downlink slot only that satisfies the condition of $n_s$ mod 2 in Table 3 and Table 4 above and the CSI-RS subframe configuration.

In the case of frame structure type 2 (TDD), in the subframe that collides with a special subframe, SS, PBCH or SIB 1 (SystemInformationBlockType1) message transmission or the subframe that is configured to transmit a paging message, the CSI-RS is not transmitted.

In addition, the RE in which the CSI-RS for a certain antenna port that is belonged to an antenna port set S (S={15}, S={15,16}, S={17 18}, S={19,20} or S={21,22}) is transmitted is not used for transmitting the PDSCH or the CSI-RS of another antenna port.

Since the time-frequency resources used for transmitting the CSI-RS is unable to be used for transmitting data, the data throughput decreases as the CSI-RS overhead increases. Considering this, the CSI-RS is not configured to be transmitted in every subframe, but configured to be transmitted in a certain transmission period that corresponds to a plurality of subframes. In this case, the CSI-RS transmission overhead may be significantly decreased in comparison with the case that the CSI-RS is transmitted in every subframe.

The subframe period (hereinafter, referred to as 'CSI-RS transmission period'; $T_{CSI-RS}$) for transmitting the CSI-RS and the subframe offset ($\Delta_{CSI-RS}$) are represented in Table 5 below.

Table 5 exemplifies the configuration of CSI-RS subframe.

TABLE 5

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

Referring to Table 5, according to the CSI-RS subframe configuration ($I_{CSI-RS}$), the CSI-RS transmission period ($T_{CSI-RS}$) and the subframe offset ($\Delta_{CSI-RS}$) are determined.

The CSI-RS subframe configuration in Table 5 is configured as one of the 'SubframeConfig' field and the 'zeroTx-PowerSubframeConfig' field in Table 2 above. The CSI-RS subframe configuration may be separately configured for the NZP CSI-RS and the ZP CSI-RS.

The subframe including the CSI-RS satisfies Equation 18 below.

$$(10n_f + \lfloor n_s/2 \rfloor - \Delta_{CSI-RS}) \bmod T_{CSI-RS} = 0 \quad \text{[Equation 18]}$$

In Equation 18, $T_{CSI-RS}$ represents the CSI-RS transmission period, $\Delta_{CSI-RS}$ represents the subframe offset value, $n_f$ represents the system frame number, and $n_s$ represents the slot number.

In the case of a UE to which transmission mode 9 is set for a serving cell, a single CSI-RS resource may be set to the UE. In the case of a UE to which transmission mode 10 is set for a serving cell, one or more CSI-RS resources may be set to the UE.

For each CSI-RS resource configuration, the following parameters may be set through high layer signaling.

In the case that transmission mode 10 is set, the CSI-RS resource configuration identifier The number of CSI-RS ports The CSI-RS configuration (refer to Table 3 and Table 4)

The CSI-RS subframe configuration ($I_{CSI-RS}$; refer to Table 5)

In the case that transmission mode 9 is set, the transmission power ($P_c$) for the CSI feedback In the case that transmission mode 10 is set, the transmission power ($P_c$) for the CSI feedback with respect to each CSI process. When the CSI subframe sets $C_{CSI,0}$ and $C_{CSI,1}$ are set by a high layer for the CSI process, $P_c$ is set for each CSI subframe set of the CSI process.

The pseudo-random sequence generator parameter ($n_{ID}$)

In the case that transmission mode 10 is set, the QCL scrambling identifier (qcl-ScramblingIdentity-r11) for assuming the Quasi Co-Located (QCL) type B UE, the CRS port count (crs-PortsCount-r11), and the high layer parameter ('qcl-CRS-Info-r11') that includes the MBSFN subframe configuration list (mbsfn-SubframeConfigList-r11) parameter When the CSI feedback value obtained by a UE has the value in the range of [−8, 15] dB, $P_c$ is presumed by the ratio of the PDSCH EPRE for the CSI-RS EPRE. Herein, the PDSCH EPRE corresponds to the symbol in which the ratio of PDSCH EPRE for the CRS EPRE is $\rho_A$.

In the same subframe of a serving cell, the CSI-RS and the PMCH are not configured together.

When four CRS antenna ports are configured in frame structure type 2, the CSI-RS configuration index belonged to [20-31] set in the case of the normal CP (refer to Table 3) or [16-27] set in the case of the extended CP (refer to Table 4) is not configured to a UE.

A UE may assume that the CSI-RS antenna port of the CSI-RS resource configuration has the QCL relation with the delay spread, the Doppler spread, the Doppler shift, the average gain and the average delay.

The UE to which transmission mode 10 and QCL type B are configured may assume that the antenna ports 0 to 3 corresponding to the CSI-RS resource configuration and the antenna ports 15 to 22 corresponding to the CSI-RS resource configuration have the QCL relation with the Doppler spread and the Doppler shift.

For the UE to which transmission mode 10 is configured, one or more Channel-State Information—Interference Measurement (CSI-IM) resource configuration may be set.

The following parameters may be configured for each CSI-IM resource configuration through high layer signaling.

The ZP CSI-RS configuration (refer to Table 3 and Table 4)

The ZP CSI-RS subframe configuration ($I_{CSI-RS}$; refer to Table 5)

The CSI-IM resource configuration is the same as one of the configured ZP CSI-RS resource configuration.

In the same subframe in a serving cell, the CSI-IM resource and the PMCH are not configured simultaneously.

For the UE to which transmission modes 1 to 9 are set, a ZP CSI-RS resource configuration may be set to the UE for the serving cell. For the UE to which transmission mode 10 is set, one or more ZP CSI-RS resource configurations may be set to the UE for the serving cell.

The following parameters may be configured for the ZP CSI-RS resource configuration through high layer signaling.

The ZP CSI-RS configuration list (refer to Table 3 and Table 4)

The ZP CSI-RS subframe configuration ($I_{CSI-RS}$; refer to Table 5)

In the same subframe in a serving cell, the ZP CSI-RS resource and the PMCH are not configured simultaneously.

Cell Measurement/Measurement Report

For one or several methods among the several methods (handover, random access, cell search, etc.) for guaranteeing the mobility of UE, the UE reports the result of a cell measurement to an eNB (or network).

In the 3GPP LTE/LTE-A system, the cell-specific reference signal (CRS) is transmitted through 0, 4, 7 and $11^{th}$ OFDM symbols in each subframe on the time axis, and used for the cell measurement basically. That is, a UE performs the cell measurement using the CRS that is received from a serving cell and a neighbor cell, respectively.

The cell measurement is the concept that includes the Radio resource management (RRM) measurement such as the Reference signal receive power (RSRP) that measures the signal strength of the serving cell and the neighbor cell or the signal strength in comparison with total reception power, and so on, the Received signal strength indicator (RSSI), the Reference signal received quality (RSRQ), and the like and the Radio Link Monitoring (RLM) measurement that may evaluate the radio link failure by measuring the link quality from the serving cell.

The RSRP is a linear average of the power distribution of the RE in which the CRS is transmitted in a measurement frequency band. In order to determine the RSRP, CRS (R0) that corresponds to antenna port '0' may be used. In addition, in order to determine the RSRP, CRS (R1) that corresponds to antenna port '1' may be additionally used. The number of REs used in the measurement frequency band and the measurement duration by a UE in order to determine the RSRP may be determined by the UE within the limit that satisfies the corresponding measurement accuracy requirements. In addition, the power per RE may be determined by the energy received in the remaining part of the symbol except the CP.

The RSSI is obtained as the linear average of the total reception power that is detected from all sources including the serving cell and the non-serving cell of the co-channel, the interference from an adjacent channel, the thermal noise, and so on by the corresponding UE in the OFDM symbols including the RS that corresponds to antenna port '0'. When a specific subframe is indicated by high layer signaling for performing the RSRQ measurement, the RSSI is measured through all OFDM symbols in the indicated subframes.

The RSRQ is obtained by N×RSRP/RSSI. Herein, N means the number of RBs of the RSSI measurement bandwidth. In addition, the measurement of the numerator and the denominator in the above numerical expression may be obtained by the same RB set.

A BS may forward the configuration information for the measurement to a UE through high layer signaling (e.g., RRC Connection Reconfiguration message).

The RRC Connection Reconfiguration message includes a radio resource configuration dedicated ('radioResourceConfigDedicated') Information Element (IE) and the measurement configuration ('measConfig') IE.

The 'measConfig' IE specifies the measurement that should be performed by the UE, and includes the configuration information for the intra-frequency mobility, the inter-frequency mobility, the inter-RAT mobility as well as the configuration of the measurement gap.

Particularly, the 'measConfig' IE includes 'measObjectToRemoveList' that represents the list of the measurement object ('measObject') that is to be removed from the measurement and 'measObjectToAddModList' that represents the list that is going to be newly added or amended. In addition, 'MeasObjectCDMA2000', 'MeasObjctEUTRA', 'MeasObjectGERAN' and so on are included in the 'measObject' according to the communication technique.

The 'RadioResourceConfigDedicated' IE is used to setup/modify/release the Radio Bearer, to change the MAC main configuration, to change the Semi-Persistent Scheduling (SPS) configuration and to change the dedicated physical configuration.

The 'RadioResourceConfigDedicated' IE includes the 'measSubframePattern-Serv' field that indicates the time domain measurement resource restriction pattern for serving cell measurement. In addition, the 'RadioResourceConfigDedicated' IE includes 'measSubframeCellList' indicating the neighbor cell that is going to be measured by the UE and 'measSubframePattern-Neigh' indicating the time domain measurement resource restriction pattern for neighbor cell measurement.

The time domain measurement resource restriction pattern that is configured for the measuring cell (including the serving cell and the neighbor cell) may indicate at least one subframe per radio frame for performing the RSRQ measurement. The RSRQ measurement is performed only for the subframe indicated by the time domain measurement resource restriction pattern that is configured for the measuring cell.

As such, a UE (e.g., 3GPP Rel-10) should measure the RSRQ only in the duration configured by the subframe pattern ('measSubframePattern-Serv') for the serving cell measurement and the subframe pattern ('measSubframePattern-Neigh') for the neighbor cell measurement.

Although the measurement in the pattern for the RSRQ is not limited, but it is preferable to be measured only in the pattern for the accuracy requirement.

OTDOA (Observed Time Difference of Arrival) Method

An OTDOA method will be described in detail below.

FIG. 16 illustrates an OTDOA method for positioning a UE.

Referring to FIG. 16, a UE generates a reference clock signal on the basis of a subframe transmitted from a current serving cell, and thus signals received from neighbor cells have different times of arrival (TOAs).

The serving cell and neighbor cells may be referred to as a serving eNB and neighbor eNBs, respectively.

That is, the OTDOA method is to measure the position of a UE using a difference between times of arrival of signals transmitted from cells at the UE. Since a reference cell is a reference of TDOA, a delay time of a signal received from each of a plurality of neighbor cells from a time taken to receive a signal from a single reference cell is measured using reference signals or synchronization signals received from the plurality of neighbor cells and reported to a serving cell or an anchor cell, and the serving cell measures the position of the corresponding UE using the reported delay times.

Here, the reference cell refers to a cell that can be a reference of TDOA (Time Difference of Arrival), and the serving cell may correspond to the reference cell or a serving cell before handover operation may correspond thereto when the UE performs the handover operation. Otherwise, the reference cell may not be changed irrespective of handover operation of the UE.

While a common reference signal (CRS) or a primary synchronization signal/secondary synchronization signal (PSS/SSS) may be used as a measurement signal for positioning a UE, a dedicated positioning reference signal (PRS) for a location service (LCS) may be used.

The positioning reference signal may be referred to as a positioning pilot signal.

UE Positioning Method

Next, a UE positioning method will be described.

According to a UE positioning method using a PRS, a UE receives assistance data from a serving eNB, receives PRSs from a reference cell and a neighbor cell using the assistance data, calculates a reference signal time difference (referred to as "RSTD" hereinafter) and transmits the RSTD to the serving eNB.

Then, the serving eNB transmits the RSTD to a location server and the location server determines the position of the UE using the RSTD.

The RSTD refers to a relative timing difference between the reference cell and the neighbor cell and is defined as $T_{subframeRxj} - T_{subframeRxi}$.

Here, $T_{subframeRxj}$ is a time when the UE receives the start point of one subframe from a neighbor cell j and $T_{subframeRxi}$ is a time when the UE receives the start point of one subframe, which is closest to the subframe received from the cell j, from a reference cell i.

When the reference cell and neighbor cells can transmit PRSs at similar times and thus transmit the PRSs at similar times, differences between a time when the UE receives a PRS from the reference cell and the times when the UE receives PRSs from the neighbor cells are within a predetermined time range.

For example, a difference between the time when the UE receives the PRS from the reference cell and the time when the UE receives the PRS from each neighbor cell can be within one subframe.

In definition of the RSTD, if one subframe received by the UE from the neighbor cell j is the first subframe of PRS positioning occasions of the neighbor cell j, one subframe which is received from the cell i and is closest to the subframe received from the cell j is the first subframe of PRS positioning occasions of the reference cell i.

Here, PRS positioning occasions refer to consecutive downlink subframes to which PRSs are allocated. Accordingly, the RSTD corresponds to a difference between a time when a PRS is received from the neighbor cell j and a time when a PRS is received from the reference cell i.

Here, a time when a PRS is received from a specific cell is referred to as time of arrival (TOA) of the PRS.

Codebook Based Precoding Technique

To support MIMO, precoding for appropriately distributing transmission information to antennas depending on channel situation can be applied.

Codebook based precoding refers to a technique by which a transmitter (e.g., eNB) and a receiver (e.g., UE) predetermine a precoding matrix set, the receiver measures information on a channel from the transmitter and feeds back a most suitable precoding matrix (i.e., a precoding matrix index (PMI)) to the transmitter, and the transmitter applies appropriate precoding to signal transmission on the basis of the PMI.

Because this technique selects an appropriate precoding matrix from the predetermined precoding matrix set, optimal precoding is not always applied. However, feedback overhead can be reduced compared to explicit feedback of optimal precoding information over actual channel information.

FIG. 17 illustrates the basic concept of codebook based precoding.

According to codebook based precoding, a transmitter and a receiver share codebook information including a number of precoding matrices predetermined according to transmission rank and the number of antennas. That is, when feedback information is finite, a precoding based codebook method can be used. The receiver can measure a channel state through a received signal and feed back information on a finite number of preferred precoding matrices (i.e., indexes of the corresponding precoding matrices) to the transmitter on the basis of the aforementioned codebook information. For example, the receiver can measure a received signal through an ML (Maximum Likelihood) or MMSE (Minimum Mean Square Error) method to select an optical precoding matrix. While FIG. 17 shows a case in which the receiver transmits precoding matrix information per codeword to the transmitter, the present invention is not limited thereto.

Upon reception of the feedback information from the receiver, the transmitter can select a specific precoding matrix from the codebook on the basis of the received information. The transmitter that has selected the precoding matrix may perform precoding by multiplying a number of layer signals corresponding to a transmission rank by the selected precoding matrix and transmit a precoded transmission signal to the receiver through multiple antennas. The number of rows in a precoding matrix is equal to the number of antennas and the number of columns is equal to a rank value.

The rank value is equal to the number of layers and thus the number of columns is equal to the number of layers. For example, when the number of Tx antennas is 4 and the number of transport layers is 2, a precoding matrix can be configured as a 4×2 matrix. Information transmitted through each layer can be mapped to each antenna through the precoding matrix.

Upon reception of a signal precoded and transmitted by the transmitter, the receiver can perform a reverse process of precoding performed by the transmitter to restore the received signal. Since a precoding matrix satisfies conditions of a unitary matrix U such as $U*U^H=I$, in general, the reverse process of precoding can be performed in such a manner that the received signal is multiplied by a Hermitian matrix $P^H$ of the precoding matrix P used for precoding of the transmitter.

A codebook for two Tx antennas has seven precoding vectors/matrices. Here, a unitary matrix is for an open-loop system and thus the number of precoding vectors/matrices for precoding of a closed-loop system is six.

Further, a codebook for four Tx antennas has 64 precoding vectors/matrices.

The aforementioned codebooks have common characteristics such as a constant modulus (CM) property, a nested property, constrained alphabet, and the like. The CM property is that elements of all precoding matrices in a codebook do not include "0" and have the same size.

The nested property is that a lower-rank precoding matrix is designed to be configured as a subset of a specific column of a higher-rank precoding matrix. The constrained alphabet refers to a property that alphabets of elements of all precoding matrices in a codebook are configured as $$\left\{ \pm 1, \pm j, \pm \frac{(1+j)}{\sqrt{2}}, \pm \frac{(-1+j)}{\sqrt{2}} \right\}.$$

Feedback Channel Structure

In an FDD (Frequency Division Duplex) system, channel information fed back by a UE is used for downlink transmission because an eNB cannot be aware of information about a downlink channel. In the case of 3GPP LTE release-8/9, a UE feeds back downlink channel information through a PUCCH or a PUSCH. The UE periodically feeds back channel information in the case of the PUCCH and aperiodically feeds back channel information at the request of the eNB in the case of the PUSCH. Further, channel information may be fed back for all frequency bands (i.e., wideband (WB)) or channel information may be fed back for a specific number of RBs (i.e., a subband (SB)).

Codebook Structure

As described above, when a predefined codebook is shared by a transmitter and a receiver, it is possible to reduce overhead of feedback, by a receiver, of precoding information to be used for MIMO transmission from the transmitter, and thus efficient precoding can be applied.

As an example of configuring a predefined codebook, a precoder matrix can be configured using a discrete Fourier transform (DFT) matrix or a Walsh matrix. Alternatively, precoders in various forms may be configured through combination with a phase shift matrix or a phase shift diversity matrix.

In the case of co-polarization antennas, DFT codebooks have high performance. When a DFT matrix based codebook is configured, an n×n DFT matrix can be defined as represented by Equation 19.

$$DFTn:D_n(k, l) = \frac{1}{\sqrt{2}}\exp\left(-\frac{j2\pi kl}{n}\right), k, l = 0, 1, \ldots, n-1 \quad \text{[Equation 19]}$$

In the case of the DFT matrix of mathematical formula 19, only one matrix is present for a specific size n. Accordingly, to define various precoding matrices and appropriately use the same according to situation, it is possible to consider additional configuration and use of a rotated version of a DFTn matrix. Equation 20 represents an exemplary rotated DFTn matrix.

$$\text{rotated } DFTn:D_n^{(G,g)}(k, l) = \frac{1}{\sqrt{2}}\exp\left(-\frac{j2\pi k\left(l+\frac{g}{G}\right)}{n}\right), \quad \text{[Equation 20]}$$
$$k, l = 0, 1, \ldots, n-1,$$
$$g = 0, 1, \ldots, G$$

When a DFT matrix is configured as represented by mathematical formula 20, G rotated DFTn matrices can be generated and the generated matrices satisfy DFT matrix properties.

To improve throughput of wireless communication systems, MIMO (Multiple-Input Multiple-Output) technology using multiple Tx/Rx antennas is used.

MIMO technology is very important for capacity improvement and performance enhancement of mobile communication, and a practical channel model reflecting an actual communication environment and propagation characteristics is required for MIMO technology verification.

A 3D spatial channel model (3D SCM) is a ray-tracing based multiple Tx/Rx antenna environment channel model and has propagation characteristics similar to actual environments.

It is possible to check a correlation and a phase difference distribution between neighbor antennas and to confirm that regions in which UEs are located have different channel characteristics, through 3D SCM analysis.

A conventional codebook method uses the same codebook irrespective of UE position.

In addition, the same codebook is applied irrespective of whether antennas are arranged in the vertical direction or in the horizontal direction.

Accordingly, the conventional codebook method cannot use position information of a UE and thus wastes the number of bits of a codebook for the same performance or has low performance for the same codebook.

Accordingly, the present description provides a method for recognizing channel characteristics through 3D SCM channel analysis and then using the same.

Specifically, the present description provides a method for using a 3D SCM channel by designing a codebook using region information (or UE position information).

That is, the present description relates to a method of designing a codebook suitable for the 3D SCM channel and includes characteristic analysis of the 3D SCM channel for the method.

The codebook design method using region information proposed in the present description can be summarized as follows.

First, a correlation and a phase difference between neighbor antennas are checked in a MIMO system.

Then, the fact that positions (or regions) at which a UE is located have different characteristics is confirmed through experiments.

That is, 3D SCM channel characteristics are checked first, and then UEs are classified (or divided) according to positions thereof and a suitable codebook is selected using information on the classified positions.

Accordingly, the method proposed in the present description can be applied to a normal MIMO system and can improve performance compared to conventional codebooks.

Furthermore, the method proposed in the present description can improve throughput for the same number of codebook bits in the conventional method or reduce the number of codebook bits for the same throughput in the conventional method.

The method for generating (or designing) a codebook on the basis of region information through 3D SCM channel analysis, proposed in the present description, will be described in detail with reference to the drawings.

In the present description, "A and/or B" can be interpreted as "at least one of A and B".

3D SCM Channel Analysis

FIG. 18 illustrates an example of a 2D antenna array structure to which methods proposed in the present description are applicable.

For 3D SCM channel characteristic analysis, the 2D antenna array structure as shown in FIG. 18 is considered.

The 2D antenna array includes horizontal antenna components 1810 and vertical antenna components 1820.

Further, a phase difference between neighbor antennas can be represented as θi, as shown in FIG. 18.

An example of a system model for 3D SCM channel analysis proposed in the present description is as shown in Table 6.

TABLE 6

| Parameters | Values |
| --- | --- |
| Cells | 1-cell, 3-sector |
| UEs | U = 30 UEs |
| Tx antenna | M = 16 (4 × 4) |
| Rx antenna | N = 1 |
| Inter-eNB distance | 500 m |
| Carrier frequency | 2 GHz(λ = 15 cm) |

3D SCAM channel characteristics, that is, a channel correlation and a channel phase between neighbor antennas will be described with reference to FIG. 18 and Table 6.

Channel Correlation

A channel correlation in a 4×4 2D antenna array is checked with reference to FIG. 19.

FIG. 19 illustrates an example of channel correlation between neighbor antennas in the antenna array of FIG. 18.

Channel correlations between an antenna positioned at a vertex (1, 1) and other antennas are as shown in FIG. 19.

FIG. 19a shows channel correlations when antenna spacing is λ/2 and FIG. 19b shows channel correlations when antenna spacing is λ.

Referring to FIG. 19, correlations between horizontal antennas are about 0.5 when antenna spacing is up to λ/2 and approximate to "0" when antenna spacing exceeds λ/2.

On the contrary, correlations between vertical antennas maintain high values even when antenna spacing increases.

That is, it can be confirmed that a 3D SCM channel has a low correlation between horizontal antennas but has a relatively high correlation between vertical antennas.

FIG. 20 illustrates an example of a UE distribution for antenna characteristic analysis proposed in the present description.

A horizontal antenna channel phase and a vertical antenna channel phase will be described with reference to FIG. 20.

Channel Phase—Horizontal Antenna

To analyze horizontal antenna channel characteristics, UEs are uniformly distributed in a hexagonal sector in the range of −60° to 60° on the basis of 0° corresponding to the sector center from which radio waves are emitted.

When UEs are distributed in the range of −60° to 60°, vertical antenna characteristics (channel phase difference) generated according to positions of the UEs may have structures as shown in FIG. 21.

As shown in FIG. 21, when UEs are positioned at 0° corresponding to the sector center, phase differences between neighbor antennas are densely distributed around 0°.

In addition, as distances between UEs and the sector center 0° increase in the horizontal direction, phase differences between neighbor antennas also increase.

Here, it can be seen that phase differences of symmetrically positioned UEs are symmetrical.

Furthermore, it can be seen that phase differences 81, 82 and 83 between neighbor antennas have the same distribution.

FIG. 21 illustrates an example of channel phase differences of horizontal antennas depending on UE position shown in FIG. 20.

Next, channel phases of vertical antennas will be described for analysis of vertical antenna channel characteristics.

Channel Phase—Vertical Antenna

FIG. 22 illustrates an example of channel phase differences of vertical antennas depending on UE position.

To analyze vertical antenna channel characteristics, UEs are arranged (or distributed) in a hexagonal sector as shown in FIG. 20 according to distances between an eNB and UEs.

In FIGS. 20 and 22, d refers to a distance ratio instead of a distance.

That is, d≈1 outside the hexagonal sector, d=0.5 at the center of the hexagonal sector and d≈0 when UEs are close to the eNB.

Phase differences between neighbor antennas in vertical antennas according to distances of UEs are as shown in FIG. 22.

As shown in FIG. 22, phase differences between neighbor vertical antennas are concentrated around 0° irrespective of positions. This is related to channel correlations described with reference to FIG. 19.

As shown in FIG. 22, the 3D SCM channel has very high correlations between vertical antennas and thus channel phases between vertical antennas have very similar values.

Furthermore, phase differences between vertical antennas are densely distributed around 0° as distances between the eNB and UEs increase. However, the deviation is insignificant.

Moreover, phase differences 81, 82 and 83 between neighbor vertical antennas also have the same distribution.

Codebook Generation Method Using Region Information

Next, a region information based codebook generation (or designing) method in consideration of UE position will be described.

A method of generating a codebook suitable for a 3D SCM channel will be described on the basis of the aforementioned 3D SCM channel characteristics.

In the case of the 3D SCM channel, a distribution of phase differences between neighbor antennas regularly changes according to positions of UEs, as described above.

First, vertical antennas have a very high (or strong) correlation between neighbor antennas.

A distribution of phase differences θi between neighbor antennas has a dense form and the variance of θi has a very small value.

In addition, phase differences between neighbor antennas in vertical antennas have a relationship of $\angle h_j - \angle h_1 = (j-1)(\angle h_2 - \angle h_1)$.

This characteristic can be applied to a codebook designed based on a DFT matrix.

On the contrary, horizontal antennas have a relatively low (or weak) correlation between neighbor antennas.

Phase differences θi between neighbor antennas in horizontal antennas are distributed wider than the vertical antennas (vertical antenna array) and thus the variance thereof has a large value.

Furthermore, horizontal antennas have a weaker phase difference correlation between neighbor antennas than the vertical antennas.

FIG. 23 illustrates an example of the region division concept for region based codebook generation proposed in the present description.

A region to which UEs belong may be divided as shown in FIG. 23.

First, to use channel characteristics of horizontal antennas, a sector of 120° is divided according to angles in terms of azimuth.

To use channel characteristics of vertical antennas, the sector is divided according to distances between an eNB and UEs in terms of zenith.

FIG. 23 shows an example in which the sector is divided into 4 in terms of azimuth for horizontal antennas and divided into 2 in terms of zenith for vertical antennas. However, the sector can be divided into various forms.

While FIG. 23 shows an example in which zenith angle 0° is defined as facing downward, the zenith angle 0° may be defined as facing upward.

When the zenith angle 0° is defined as facing upward, a divided region close to the eNB may be represented as zenith 180° to 107° and a divided region a longer distance from the eNB may be represented as zenith 107° to 90°.

Codebook Generation and Selection Using Region Information

Next, a method for generating and selecting a codebook using region information on the basis of region division of FIG. 23 will be described.

An area in which UEs are distributed can be divided as shown in FIG. 23.

Since divided regions have different channel correlations and channel phase differences between neighbor antennas, codebooks suitable for the divided regions are different.

Accordingly, a method of generating a codebook suitable for each region on the basis of information of each region will be described.

The method of generating a codebook using region information can be divided into (1) DFT codebook generation and (2) codebook generation using a conditional probability distribution.

First, the DFT codebook generation method using region information will be described.

A codebook can be designed or generated using a DFT matrix in order to use a phase difference between neighbor antennas.

A codebook suitable for a region to which each UE belongs is selected from a fat matrix.

The concept of selecting a codebook suitable for each divided region is illustrated in FIG. 24.

Referring to FIG. 24, a codebook suitable for each region is searched for and selected from a 64 DFT fat matrix.

First, innumerable UEs are arranged in divided regions.

Then, a codebook combination having highest average correlations with channels of the UEs is selected, and a codebook suitable for each divided region is selected through this process, as shown in FIG. 24.

Here, multiple codebooks may be simultaneously present, and a codebook having better performance can be selected according to the position of each UE.

FIG. 24 illustrates an example of DFT codebook selection using region information proposed in the present description.

Next, a method of generating a phase codebook between neighbor antennas using a conditional probability distribution will be described.

As illustrated in FIG. 25, a region information based codebook can be generated using a phase difference between neighbor antennas.

FIG. 25 illustrates an example of a codebook generation method using a phase difference between neighbor antennas using a conditional probability distribution proposed in the present description.

First, a codebook suitable for each region is selected using a distribution of phase differences, that is, $\theta i$ between neighbor antennas.

Here, $\theta i$ may have different distributions for divided regions.

Accordingly, region information can be used in such a manner that a codebook suitable for each divided region is selected on the basis of a distribution of phase differences of divided regions.

Specifically, most suitable quantization levels are selected using a distribution of $\theta 1$.

Here, the quantization levels may be selected through various methods. One of such methods is vector quantization (VQ) using Lloyd-Max algorithm.

Then, when quantization levels for $\theta 1$ are selected, a conditional distribution of $\theta 2$ based on the selected quantization levels is acquired.

Accordingly, when multiple quantization levels for $\theta 1$ are present, a conditional distribution of $\theta 2$ for each of the quantization levels is present and quantization levels of $\theta 2$ are selected as in the case of $\theta 1$.

Accordingly, a codebook generated using a conditional probability distribution is composed of code vectors in which a quantization level of the next antenna element is determined depending on a quantization level of the previous antenna element.

Referring to FIG. 25, when a quantization level of $-48°$ is selected for $\theta 1$, for example, presence of a quantization level of $-82°$ or $-11°$ can be seen using the conditional distribution of $\theta 2$.

When a quantization level of $47°$ is selected for $\theta 1$, presence of a quantization level of $8°$ or $79°$ can be seen using the conditional distribution of $\theta 2$.

A quantization level of $\theta 3$ is determined according to a process similar to the aforementioned process. In this manner, a code vector in a tree structure is generated.

Here, a code vector may be represented as a precoding matrix vector.

As another example, in a codebook generated using a conditional probability distribution, when the first element of a code vector is determined through the aforementioned region based information, the following elements can be automatically generated in a specific function form.

In this manner, a generation function and pattern for generating elements of a code vector can be previously shared between an eNB and a UE.

That is, when the generation function and pattern are defined and used for codebook generation, the number of multiple codebooks is not fixed in advance and, when a specific codebook generation factor such as the aforementioned region based information is provided or generated, a specific codebook using the factor as a seed value is automatically generated by being triggered by provision or generation of the factor.

As another embodiment proposed in the present description, a UE may additionally feed back a specific parameter value that can represent an angular spread of a radio channel to an eNB.

For example, the UE may individually feed back, to the eNB, parameters for an azimuth angular spread and a zenith angular spread.

Through this additional feedback process, the eNB may recognize a spatial channel environment in which the UE is located (or the eNB may directly estimate the same through uplink RS transmission of the UE).

For example, referring to TR 36.873, channel environments of 3D-UMa and 3D-UMi are different and angular spreads therefor are differently modeled.

In addition, the angular spreads may be different for UEs depending on whether UEs are in an LOS (Line of Sight) environment or in an environment having many NLOS (Non Line of Sight) components.

Accordingly, when the eNB receives information additionally fed back from the UE, the eNB can cause the multiple codebook sets (or the codebook generation function and pattern) adapted to corresponding angular spread characteristics to be differently applied.

In other words, the structure of the codebook proposed in the present description is determined by a kind of 2-level hierarchy and thus can be normalized and extended.

For example, (1) a primary codebook set (or the codebook generation function and pattern) is determined using angular spread characteristics as a factor.

Then, (2) a secondary codebook set (or the codebook generation function and pattern) selected from a candidate group determined in (1) is determined according to a codebook generation factor such as the aforementioned region based information and the UE finally applies a CSI reporting operation for the determined secondary codebook.

Regarding the aforementioned codebook generated using region information, a codebook suitable for each (divided) region is selected, available multiple codebooks may be present, and an eNB and a UE may previously share codebook information about all (or some) regions through RRC signaling.

In an environment in which the codebook based on region information is used, UE positions may be continuously changed and thus it is important that the eNB correctly estimate UE positions.

Accordingly, for correct estimation of varying UE positions, a PRS (Positioning Reference Signal) based OTDOA positioning method, an SRS based UTDOA method, an A-GNSS method using satellite/GPS, an RFPM method and a hybrid method of these LTE based positioning methods can be applied to UE positioning.

For an estimated UE position, the eNB may select a preset codebook for the corresponding region and instruct the UE to perform CSI reporting using the selected codebook through RRC signaling or dynamic signaling (e.g., by DCI triggering).

Accordingly, UEs belonging to the same region use the same codebook and UEs distributed in different regions use different codebooks.

Evaluation of Performance of DFT Codebook Using Region Information

System level performance evaluation with respect to the DFT codebook from among region information based codebooks proposed in the present description will be briefly described.

Only four horizontal antennas and four vertical antennas are considered differently from the 2D antenna array shown in FIG. 18.

A system model environment and parameters used for performance evaluation are shown in Table 7 and performance is evaluated in terms of channel correlation and UE throughput.

TABLE 7

| Parameters | Values |
| --- | --- |
| Cells | 19-cell, 57-sector (3 sector/cell) |
| UEs | U = 30 UEs per sector |
| Tx antenna | M = 4 (4 × 1 or 1 × 4) with 0.5λ antenna spacing |
| Rx antenna | N = 1 |
| Tx power | 40 W (46 dBm) |
| Noise | −104 dBm/10 MHz |
| Channel model | 3D SCM channel |
| Scheduling | PF (for 30 UEs) |
| Pathloss model | 3D SCM UMa model |
| Antenna pattern | 3D SCM UMa model |
| Antenna height | BS: 25 m, UE: 1.5 m~22.5 m |
| Inter-eNB distance | 500 m |
| Carrier frequency | 2 GHz |
| Cells | 100 frames |
| Codebook | Variations of 16 DFT codebook |

Performance Evaluation—Channel Correlation

A channel correlation C=|E[HH*]| is measured for four antennas.

An area is divided into 1→2→4 regions in terms of azimuth for the four horizontal antennas.

The area is divided into 1→2→4 regions in terms of zenith for the four vertical antennas.

The DFT codebook has a size of 0 to 3 bits and the result of evaluation is as shown in Table 7.

A conventional DFT codebook mentioned in Table 7 refers to a DFT codebook that equally divides phases in constellation without region information.

That is, conventional division DFT codebook: 0 bit=[0° ], 1 bit [0° 180°]

Referring to Table 7, it can be confirmed that a high correlation can be obtained for the same codebook size when region information is applied, compared to a case in which a DFT codebook (conventional DFT) without using region information is used.

Here, it can be confirmed that a very high correlation can be obtained through the DFT codebook in the case of vertical antennas. This is because a phase difference between neighbor antennas in vertical antennas is very similar to a DFT matrix as described above in analysis of characteristics of phases between vertical neighbor antennas.

However, phase distributions are similar irrespective of regions in the case of vertical antennas, and thus performance improvement is insignificant even when the number of region divisions increases.

Conversely, phase characteristics between neighbor antennas differ from the DFT codebook in the case of horizontal antennas, high performance cannot be obtained in terms of channel correlation compared to vertical antennas.

However, since a phase distribution largely depends on region in the case of horizontal antennas, performance is improved as the number of region divisions increases.

When a codebook size is sufficiently large, i.e., 3 bits, however, codebook performance improvement based on region information division is insignificant because the performance of the conventional DFT codebook also has high performance.

TABLE 8

| Codebook Size | Conventional DFT | # Azimuth Regions | | | # Zenith Regions | | |
| --- | --- | --- | --- | --- | --- | --- | --- |
| | | 1 | 2 | 4 | 1 | 2 | 4 |
| 0 bit | 2.10 | 2.10 | 2.38 | 2.57 | 3.11 | 3.15 | 3.17 |
| 1 bit | 2.23 | 2.71 | 2.89 | 2.97 | 3.30 | 3.32 | 3.33 |
| 2 bit | 2.95 | 3.09 | 3.14 | 3.17 | 3.40 | 3.41 | 3.41 |
| 3 bit | 3.17 | 3.24 | 3.25 | 3.26 | — | — | — |

Performance Evaluation—UE Throughput

As a performance evaluation index, UE throughput can be evaluated as a cumulative distribution function (CDF).

Throughput defined as "UE throughput [bps/Hz/UE]" is cumulative weighted sum throughput of each UE and refers to cumulative throughput provided to each UE for a frame period corresponding to "UE life" of Table 6 in a full buffer traffic state.

FIGS. 26 and 27 illustrate UE throughput results as a region information based codebook performance index.

FIG. 26 shows a UE throughput result when Tx antennas M=1×4 and FIG. 27 shows a UE throughput result when Tx antennas M=4×1.

As shown in FIGS. 26 and 27, UE throughput results show the same tendency as the channel correlation performance result of Table 8.

In the case of a vertical codebook, a simple throughput value is high but performance improvement according to an increase in the number of divided regions is insignificant.

In the case of a horizontal codebook, performance improvement according to an increase in the number of divided regions is relatively high when the number of codebook bits is small.

General Apparatuses to which the Present Invention is Applicable

FIG. 28 is a block diagram of a wireless communication apparatus according to an embodiment of the present invention.

Referring to FIG. 28, a wireless communication system includes an eNB 2810 and multiple UEs 2820 located within the coverage of the eNB 2810.

The eNB 2810 includes a processor 2811, a memory 2812 and a radio frequency (RF) unit 2813. The processor 2811 implements functions, processes and/or methods proposed in FIGS. 1 to 27. Radio interface protocol layers can be implemented by the processor 2811. The memory 2812 is connected to the processor 2811 and stores various types of information for driving the processor 2811. The RF unit 2813 is connected to the processor 2811 and transmits and/or receives radio signals.

The UE 2820 includes a processor 2821, a memory 2822 and an RF unit 2823. The processor 2821 implements functions, processes and/or methods proposed in FIGS. 1 to 27. Radio interface protocol layers can be implemented by the processor 2821. The memory 2822 is connected to the processor 2821 and stores various types of information for driving the processor 2821. The RF unit 2823 is connected to the processor 2821 and transmits and/or receives radio signals.

The memories 2812 and 2822 may be located inside or outside of the processors 2811 and 2821 and connected to the processors 2811 and 2822 through various known means. Furthermore, the eNB 2810 and/or the UE 2820 may have a single antenna or multiple antennas.

FIG. 29 is a block diagram of a wireless communication apparatus according to another embodiment of the present invention.

While one eNB and one UE are shown for simple illustration of a wireless communication system, the wireless communication system may include one or more eNBs and/or one or more UEs.

Referring to FIG. 29, an eNB 2910 may include a Tx data processor 2911, a symbol modulator 2912, a transmitter 2913, a Tx/Rx antenna 2914, a processor 2915, a memory 2916, a receiver 2917, a symbol demodulator 2918 and an Rx data processor 2919.

In addition, a UE 2920 may include a Tx data processor 2921, a symbol modulator 2922, a transmitter 2923, a Tx/Rx antenna 2924, a processor 2925, a memory 2926, a receiver 2927, a symbol demodulator 2928 and an Rx data processor 2929.

While the figure shows that each of the eNB and the UE includes single antenna, the eNB and the UE include multiple antennas.

Accordingly, the eNB and the UE according to the present invention support the MIMO system. The eNB and the UE according to the present invention support both SUMIMO (Single User-MIMO) and MU-MIMO (Multi User-MIMO).

On downlink, the Tx data processor receives traffic data, formats and codes the received traffic data, and interleaves and modulates (or symbol-maps) the coded traffic data to provide modulated symbols ("data symbols"). The symbol modulator receives and processes the data symbols and pilot symbols to provide a symbol stream.

The symbol modulator multiplexes the data and pilot symbols and transmits the multiplexed symbols to the transmitter. Here, the transmitted symbols may be data symbols, pilot symbols or zero signal values. In each symbol period, the pilot symbols may be continuously transmitted. The pilot symbols may be frequency division multiplexing (FDM), orthogonal frequency division multiplexing (OFDM), time division multiplexing (TDM) or code division multiplexing (CDM) symbols.

The transmitter receives the symbol stream, converts the symbol stream into one or more analog signals and additionally processes (e.g., amplifies, filters and frequency upconverts) the analog signals to generate a downlink signal suitable for transmission over a radio channel. Then, the downlink signal is transmitted to the UE through the antenna.

In the UE, the antenna receives the downlink signal from the eNB and provides the received signal to the receiver. The receiver adjusts (e.g., filters, amplifies and frequency downconverts) the received signal and digitizes the adjusted signal to acquire samples. The symbol demodulator demodulates received pilot symbols and provides the demodulated symbols to the processor for channel estimation.

In addition, the symbol demodulator receives a frequency response estimate for the downlink signal from the processor, performs data demodulation for received data symbols to acquire data symbol estimates (estimates of transmitted data symbols) and provides the data symbol estimates to the Rx data processor. The Rx data processor demodulates (i.e., symbol demaps), deinterleaves and decodes the data symbol estimates to restore the transmitted traffic data.

The processes of the symbol demodulator and the Rx data processor and the processes of the symbol modulator and the Tx data processor in the eNB are complementary.

On uplink, in the UE, the Tx data processor processes traffic data and provides data symbols. The symbol modulator receives the data symbols, multiplexes the data symbols with pilot symbols, modulates the multiplexed symbols and provides a symbol stream to the transmitter. The transmitter receives and processes the symbol stream to generate an uplink signal. The uplink signal is transmitted to the eNB through the antenna.

In the eNB, the uplink signal is received from the UE through the antenna. The receiver processes the received uplink signal to acquire samples. Then, the symbol demodulator processes the samples and provides received pilot symbols and data symbol estimates for uplink. The Rx data processor processes the data symbol estimates to restore the traffic data transmitted from the UE.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memories may be located at the interior or exterior of the processors and may transmit data to and receive data from the processors via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While examples in which the precoding method in the wireless communication system according to the present invention is applied to 3GPP LTE/LTE-A have been described, the present invention is applicable to various wireless communication systems in addition to 3GPP LTE/LTE-A.

The invention claimed is:

1. A method for precoding, performed by a user equipment (UE), using a codebook in a wireless communication system, the method comprising:
    receiving a reference signal for channel estimation from an evolved Node B (eNB);
    estimating a channel based on the received reference signal;
    determining a precoding matrix related to the estimated channel in a codebook; and
    feeding back, to the eNB, a precoding matrix index (PMI) corresponding to the determined precoding matrix,
    wherein the codebook is generated based on at least one of a region to which the UE belongs and the position of the UE, and
    wherein the region to which the UE belongs corresponds to one of M×N regions generated by dividing a specific sector of the eNB into M regions in a first direction and N regions in a second direction.

2. The method according to claim 1, wherein different codebooks are used in each of the M×N regions.

3. The method according to claim 1, wherein when multiple codebooks are selected based on multiple regions to which the UE belongs, the codebook is selected from among the selected multiple codebooks based on the position of the UE.

4. The method according to claim 1, wherein at least one of a channel phase difference and a channel correlation difference between neighbor antennas of the eNB is generated according to at least one of the region to which the UE belongs and the position of the UE.

5. The method according to claim 4, wherein the codebook is generated by selecting a quantization level for a first phase difference between neighbor antennas of the eNB and selecting a quantization level for a second phase difference on the basis of the selected quantization level for the first phase difference.

6. The method according to claim 5, wherein the quantization level for the first phase difference is selected based on at least one of the region to which the UE belongs and the position of the UE.

7. The method according to claim 5, wherein the quantization level for the second phase difference is selected on the basis of a predefined precoding matrix vector generation function or pattern information.

8. The method according to claim 1, further comprising: transmitting, to the eNB, a parameter related to an angular spread between the eNB and the UE.

9. The method according to claim 8, wherein the codebook is selected in such a manner that a first codebook set is selected on the basis of the parameter related to the angular spread, a second codebook set is selected from the selected first codebook set on the basis of at least one of the region to which the UE belongs and the position of the UE, and one of the selected second codebook set is selected.

10. The method according to claim 8, wherein the angular spread is divided into an azimuth angular spread and a zenith angular spread.

11. The method according to claim 1, wherein the position of the UE is acquired through at least one of a PRS (Positioning Reference Signal) based OTDOA (Observed Time Difference Of Arrival) positioning method, a SRS (Sounding Reference Signal) based UTDOA (Uplink Time Difference Of Arrival) method, an A-GNSS (Assisted-Global Navigation Satellite Systems) method using a satellite/GPS and an RFPM (Radio Frequency Pattern Matching) method.

12. A user equipment (UE) that performs precoding using a codebook in a wireless communication system, the UE comprising:
    a transmitter and a receiver; and
    a processor, functionally connected to the transmitter and receiver, that:
    controls the receiver to receive a reference signal for channel estimation from an evolved Node B (eNB);
    estimates a channel based on the received reference signal;
    determines a precoding matrix related to the estimated channel in a codebook; and
    feeds back, to the eNB, a precoding matrix index (PMI) corresponding to the determined precoding matrix,
    wherein the codebook is generated based on at least one of a region to which the UE belongs and the position of the UE, and
    wherein the region to which the UE belongs corresponds to one of M×N regions generated by dividing a specific sector of the eNB into M regions in a first direction and N regions in a second direction.

* * * * *